(12) United States Patent
Li et al.

(10) Patent No.: US 8,286,939 B2
(45) Date of Patent: Oct. 16, 2012

(54) PULSE WIDTH MODULATED FLUIDIC VALVE

(75) Inventors: Perry Y. Li, Plymouth, MN (US); Thomas R. Chase, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 622 days.

(21) Appl. No.: 12/444,910

(22) PCT Filed: Oct. 10, 2007

(86) PCT No.: PCT/US2007/021636
§ 371 (c)(1),
(2), (4) Date: Apr. 9, 2009

(87) PCT Pub. No.: WO2008/045467
PCT Pub. Date: Apr. 17, 2008

(65) Prior Publication Data
US 2010/0212743 A1     Aug. 26, 2010

Related U.S. Application Data

(63) Continuation-in-part of application No. 11/545,715, filed on Oct. 10, 2006, now abandoned.

(51) Int. Cl.
*F16K 5/10*     (2006.01)
(52) U.S. Cl. .................... 251/290; 251/208; 251/205
(58) Field of Classification Search ........... 251/205–209
See application file for complete search history.

(56) References Cited

U.S. PATENT DOCUMENTS

| | | | |
|---|---|---|---|
| 4,136,655 A * | 1/1979 | Mannhardt | 123/462 |
| 4,649,955 A | 3/1987 | Otto et al. | 137/624.13 |
| 5,242,150 A | 9/1993 | Shiffler et al. | 251/209 |
| 5,524,822 A * | 6/1996 | Simmons | 239/17 |
| 5,727,591 A | 3/1998 | Doll | 251/207 |
| 6,047,949 A * | 4/2000 | Beauchemin, Jr. | 251/257 |
| 6,053,472 A | 4/2000 | DeLand | 251/129.11 |
| 6,386,229 B1 * | 5/2002 | Morikawa et al. | 137/552 |
| 6,457,698 B2 | 10/2002 | Wichmann | 251/108 |
| 6,808,162 B2 | 10/2004 | Tranovich et al. | 251/209 |

(Continued)

FOREIGN PATENT DOCUMENTS

DE     26 04 208 A1     8/1977

(Continued)

OTHER PUBLICATIONS

Search Report and Written Opinion, PCT/US2007/021636, dated Jan. 18, 2008.

(Continued)

*Primary Examiner* — Dinh Q Nguyen
(74) *Attorney, Agent, or Firm* — Westman, Champlin & Kelly, P.A.

(57) ABSTRACT

A pulse width modulated fluidic valve 3005 includes a cylinder (352) having an elongate bore, a length, and first (344) and second (346) ports which extend from outside the cylinder (352) into the bore. A rotatable spool (302) is carried in the bore and movable in a direction of the length of cylinder (352). The spool (302) has a variable blocking feature (306) which blocks passage of fluid' between the first (344) and second (346) ports as a function of angular position relative to the first (344) and second (346) ports and as a function of linear position along the length of the cylinder (352).

14 Claims, 30 Drawing Sheets

U.S. PATENT DOCUMENTS

2003/0217772 A1    11/2003    Lu et al. .................. 137/554

FOREIGN PATENT DOCUMENTS

| DE | 28 19 404 A1 | 11/1979 |
| DE | 29 19 404 A1 | 11/1980 |
| EP | 1 298 322 A1 | 4/2003 |

OTHER PUBLICATIONS

"High Speed Rotary Pulse Width Modulated On/Off Valve", Haink C. Tu et al.; Proceedings of ASME-IMECE'07, 2007 ASME International Mechanical Engineering Congress and RD&D Expo, Nov. 11-15, 2007; Seattle Washington, USA; 13 pages.

"4. Aachener Fluidtechnisches Kolloquium", 18.-20 März 1980, Beiträge Zum Fachgebiet Hydraulik, Band 1; cover sheet plus pp. 43-61, German language version.

"Development of a Pulse-Width Modulated Pneumatic Rotary Valve for Actuator Position Control"; Royston, Tom and Singh, Rajendra; ASME Journal of Dynamic Systems Measurement, and Control; vol. 115, pp. 495-505.

* cited by examiner

PULSE WIDTH MODULATED FLUIDIC VALVE

BACKGROUND OF THE INVENTION

The present invention relates to fluidic valves of the type used to control flow of a fluid. More specifically, the present invention relates to pulse width modulated control of such fluid flow.

Fluidic valves have many applications and are generally used to control flow of a fluid between two locations. One simple valve configuration is a simple blocking element positioned in a pipe, or the like, which can be moved between at least two positions. In one position, fluid is allowed to flow through the pipe while in the other position, the blocking element seals or partially seals against the pipe and blocks or restricts flow of fluid. If multiple positions are available between the fully "on" position (with large opening) and the fully "off" position (completely closed), flow of fluid can be further controlled accordingly. Valves with adjustable partial openings are the most prevalent means of controlling the pressure or flow in a hydraulic circuit. However, flow through partially open valves induces pressure drops across the valve, and consequently throttling energy loss, given by the product of the pressure drop across the valve and the flow, is incurred. Thus, such throttling valves are inherently, inefficient.

On the other hand, valves with binary positions—fully on or fully off, are inherently more efficient, since pressure drop is small when it is fully open, and flow is cut off when it is fully close. Thus, throttling loss in either positions can be zero or very small. In order to allow such on/off valves to achieve variable flow, the valve can be pulsed on and off at different times during the operation of the system. One such mode of operation is via pulse width modulation (PWM). In a pulse width modulated valve, the valve is rapidly switched between the fully on position and the fully off position. By changing the relative duration that the valve is in either the fully on position or the fully off position to the total period of an on/off cycle, the average flow rate can be accurately controlled between a maximum flow rate and zero flow rate. Such pulse width modulated valves can be used in many applications, for example, in achieving variable displacement functions from fixed displacement pumps and motors.

One example pulse width modulated valve configuration uses an obstruction which is moved linearly in a flow conduit between a fully blocking or closed position and a fully open position. The linear driving element can be, for example, an electromagnetic solenoid, a piezoelectric actuator (such as a PZT) actuator or the like. A critical factor in the performance of a pulse width modulated or other binary on/off valve configurations is the time it takes to transition between the fully on state, and the fully off state. Since the valve is throttling the flow during transition, it induces inefficiency. In a PWM valve, the proportion of time the valve is in transition relative to the time when it is fully on or fully off should be small to be efficient. On the other hand, cycling time (which consists of the fully on, fully off, and transition times) should be small for responsiveness and for precision. Thus, a short transition time is required for both efficiency as well as responsiveness and precision.

SUMMARY OF THE INVENTION

A pulse width modulated valve consists of an element which is in continuous, unidirectional rotational motion. This element is driven by an external power source, or by the energy in the fluid flow. The motion of the rotating element is then translated to periodic high speed relative movement between a valve obstacle (land) and an inlet or exit port. By providing a means to modulate the relationship between the duration when the valve obstacle does or does not cover the inlet or exit port, the duty cycle of the PWM operation is modulated.

DETAILED DESCRIPTION OF ILLUSTRATIVE EMBODIMENTS

Figure 1:
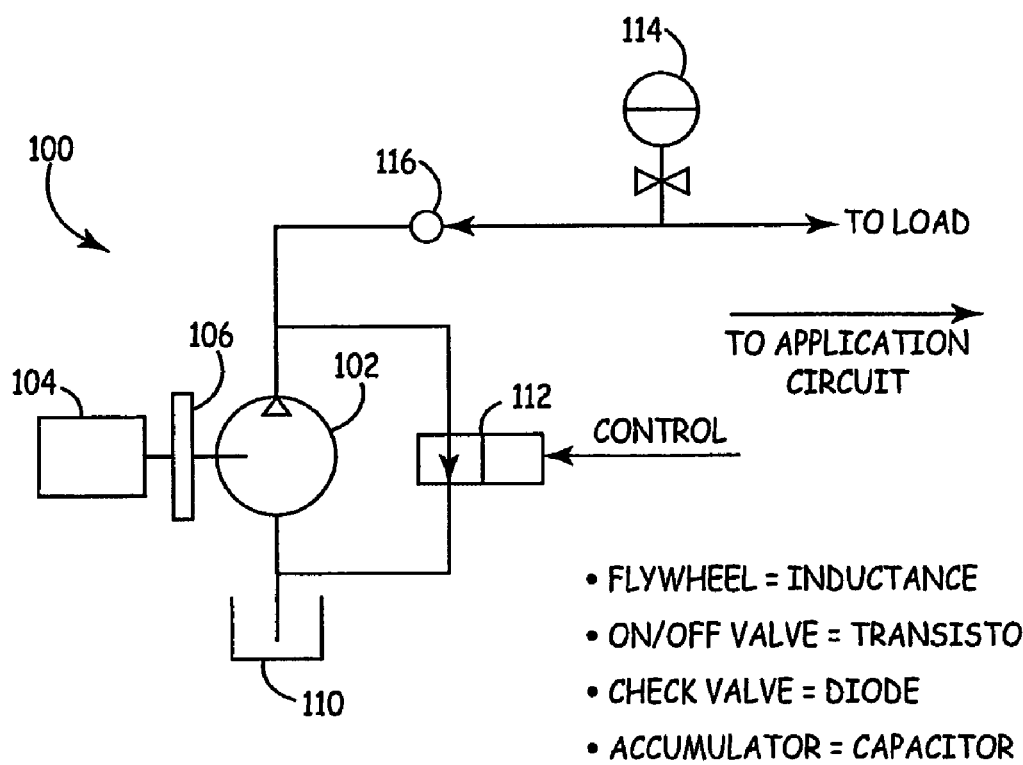
FIG. 1 is a simplified schematic diagram of a mechanical hydraulic boost converter including a pulse width modulated fluidic valve in accordance with the present invention.

One problem associated with the pulse width modulated valves described in the background section is that they must be positioned linearly at a relatively fast rate. Such linear positioning requires motion of the blocking element in one direction to be stopped, and the blocking element be accelerated rapidly in the opposite direction. This requires a large amount of force and energy, is difficult to control, and is stressful on the components of the valve. The force and power required to accelerate and decelerate the blocking element alone are proportional to the second and third power of the velocity respectively. Additional force and power, proportional to first and second power of the velocity, are needed to overcome the friction. Thus, a large actuator and a significant amount of power are needed to achieve short transition times.

The present invention provides a pulse width modulated fluidic valve in which a unidirectional rotating element is used to generate high speed relative motion between a valve obstacle and an inlet/exit port. The invention further provides a means to modulate the relationship between the duration when the valve obstacle does or does not cover the inlet or exit port, thus modulating the pulse width. In the preferred embodiment, the rotating element is a rotatable spool which rotates within a cylinder. The rotatable spool provides a passage therethrough and the speed of rotation can be used to control the frequency of the fluidic pulses through the valve. One preferred embodiment also provides a means of utilizing the energy in the fluid flow through the valve to rotate the spool, thus the valve is self-spinning and avoids the need for an external rotation actuation unit. Further, the configuration of the spool allows it to be moved axially relative to the cylinder such that the width of the pulse can be controlled, this includes the use of hydraulic or mechanical actuation.

When the obstacle covers the inlet/exit port, the valve is fully off, when the obstacle does not cover the inlet/exit port, the valve is fully on. Unlike a PWM valve that moves linearly requiring starting and stopping, the unidirectional motion of the proposed valve allows for the rotary actuator, be it an external one or the internal fluid flow, to always tend to accelerate the valve. Thus, the relative speed between the valve obstacle and the port will be consistently high, achieving a short transition time. Only friction forces need to be overcome so that the torque and power required need only be proportional to the first and second power of velocity respectively. A means to modulating the relationship between the duration when the valve obstacle does or does not cover the inlet or exit port is also provided. This serves to modulate the duty cycle of the PWM operation. Various embodiments can be developed based on this concept.

One preferred embodiment of the proposed pulse width modulated fluidic valve includes a cylinder having an elongated bore. A first port and a second port extend from outside the cylinder into the bore. A rotatable spool is carried in the bore and is movable in a direction of the length of cylinder. The spool contains passages which allows fluid to flow between the non-blocking portion of the spool surface and the center bore of the spool. The spool has a variable blocking feature, which selectively blocks passage of fluid from the first and second ports to the center of the spool, as a function of angular position relative to the first and second ports and a function of linear position along the length of the cylinder. The rotatable spool is constantly rotating unidirectionally at high speed. This achieves a high relative speed between the spool and the inlet/exit port, achieving a short transition time. By translating the spool axially along the bore, the inlet/exit port will be exposed to varying blocking features, which can be designed to achieve variable duration when the valve is fully on or fully off.

FIG. 1 is a simplified diagram showing one application of a pulse width modulated fluidic valve in a mechanical-hydraulic boost converter. In this example, a continuously running pump 102 is driven by a motor 104 through a fly wheel 106. The pump 102 draws fluid from reservoir 110. A pulse width modulated fluidic valve 112 receives a control signal which controls the amount of fluid from pump 102 which is recirculated. The fluid which is not recirculated is pumped through a check valve 116 and an accumulator 114 is used to smooth out the pulses in the flow of the fluid. This provides a controllable flow of fluid to a hydraulic load, for example, a piston/cylinder arrangement. Thus, the fixed displacement pump 102 is allowed to achieve the function of a variable displacement pump.

Figure 2A:
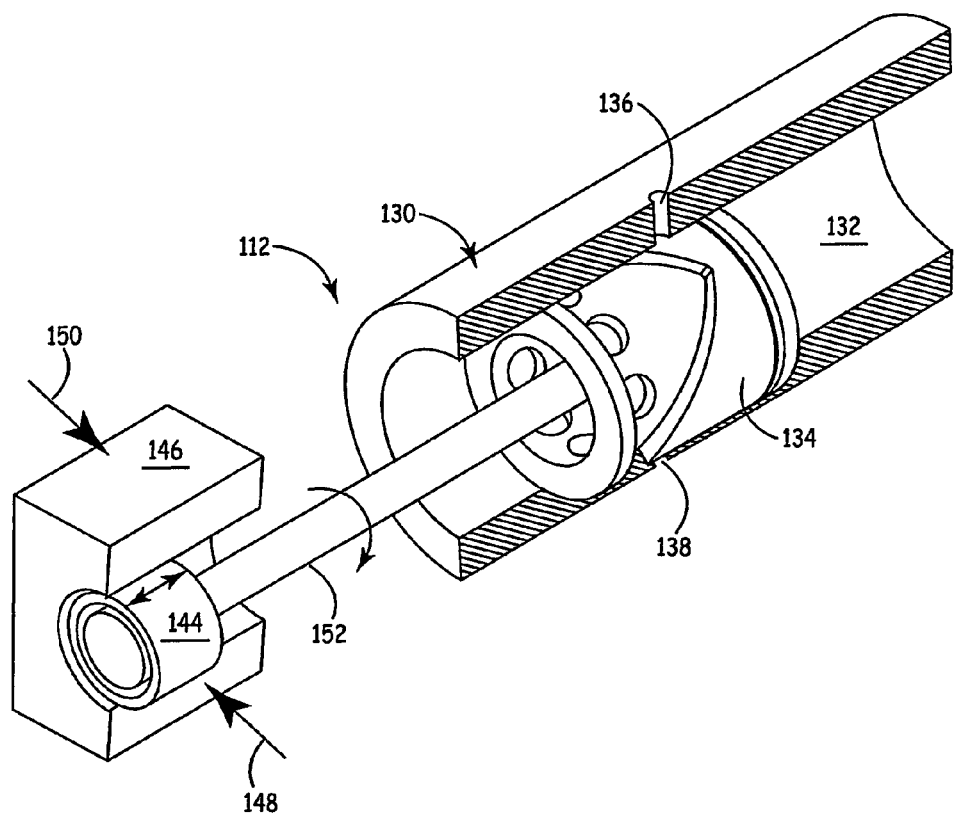
FIG. 2A is a perspective view of a pulse width modulated fluidic valve where the cylinder has been cut away through its axis to reveal the spool which travels in its bore in a first position.
Figure 2B:
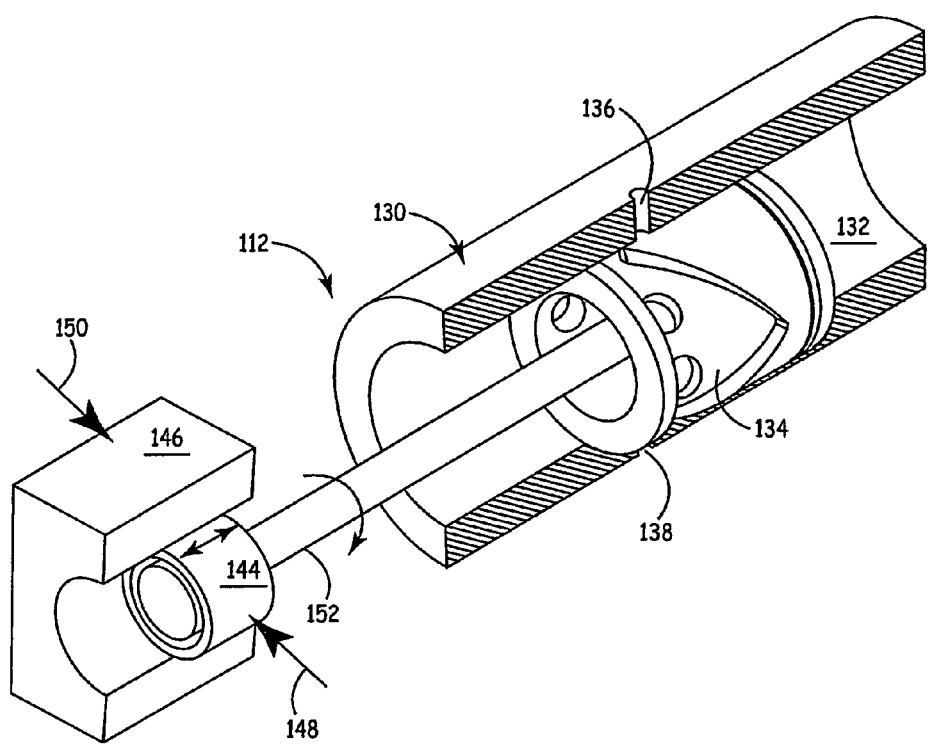
FIG. 2B is a perspective view of a pulse width modulated fluidic valve where the cylinder has been cut away through its axis to reveal the spool which travels in its bore in a second position.

FIGS. 2A and 2B are perspective views of a pulse width modulated two way (2-way) fluid valve in accordance with one embodiment. The valve cylinder has been cut away through its axis to reveal the spool which travels in its bore. In FIG. 2A, the valve 112 is arranged in a mostly closed position. While in FIG. 2B, the valve 112 is arranged in a mostly open position. Valve 112 includes an elongate cylinder 130 having a bore 132 therein. A rotatable spool 134 is positioned within bore 132. Cylinder 130 also includes first and second ports 136 and 138 which extend from outside of the cylinder into the bore 132. Valve 112 also includes a rotary driver 144 and a linear driver 146 responsive to control signals 148 and 150, respectively. Drivers 144 and 146 couple to spool 134 through spool armature 152. Rotary driver 144 is configured to rotate spool 134 relative to ports 136 and 138 of cylinder 130 in response to control signal 148. Similarly, linear driver 146 is arranged to move spool 134 linearly within cylinder 130 along an axial length of the cylinder 130 in response to the control signal 150.

Figure 3:
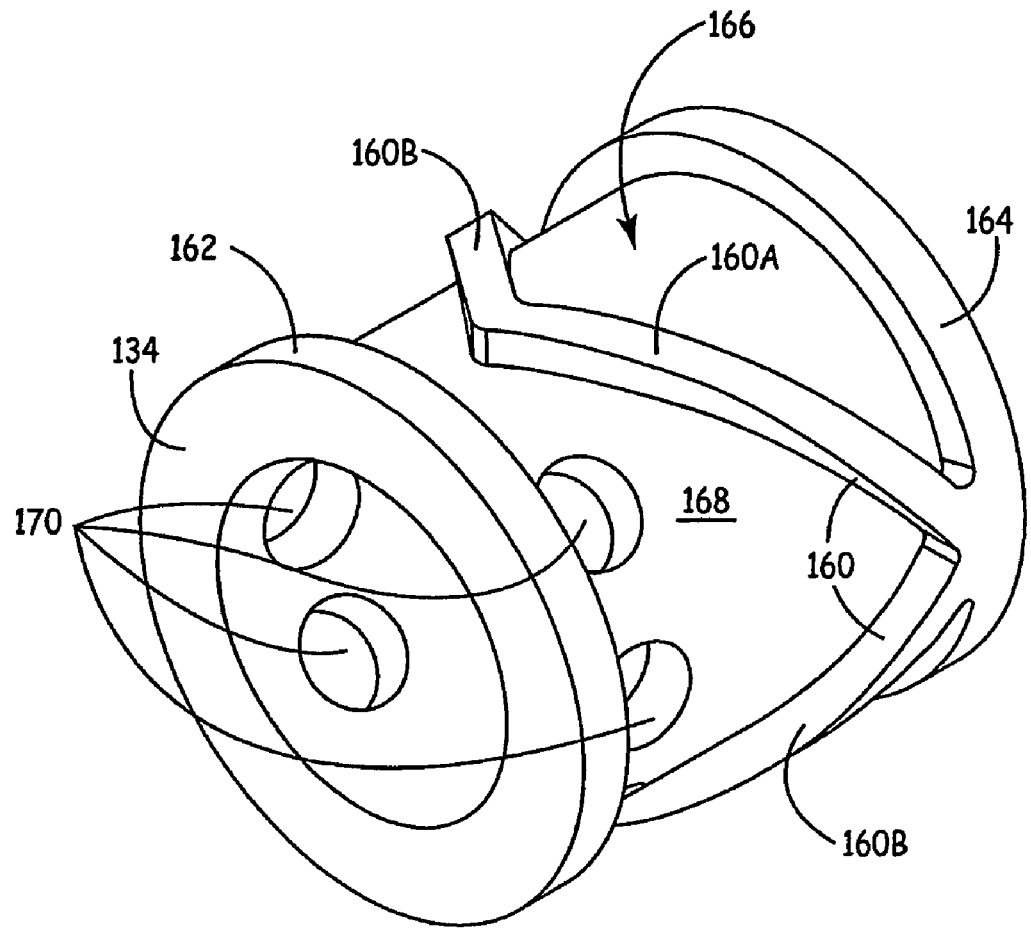
FIG. 3 is a perspective view of a rotatable spool shown in FIGS. 1 and 2.

FIG. 3 is a more detailed perspective view of spool 134. As illustrated in FIG. 3, spool 134 includes variable blocking features 160, and end seals 162 and 164. These components are configured to fluidically seal the spool 134 with respect to the wall of bore 132 of cylinder 130. The variable blocking features 160 define a fluid blocking region 166 and a fluid flow region 168. In fluid flow region 168, passageways 170 extend through spool 134.

In the configuration of FIG. 3, variable blocking feature 160 is formed as a ridge in the outer circumference of spool 134 and comprises a first helical portion 160A and a second helical portion 160B.

Turning back to FIG. 2A, as spool 134 rotates, a fluidic passageway between ports 136 and 138 will be opened or closed depending upon the position of blocking features 160 relative to ports 136 and 138. Because of the linear position of spool 134 relative to portions 136 and 138, as the spool 134 rotates, the ports 136 and 138 will reside most of the time in the fluid flow blocking region 166 and flow of fluid will be blocked by portions 160A and 160B of blocking feature 160. However, as spool 134 continues to rotate, the ports 136 and 138 will less frequently reside within fluid flow region 168 such that there can be fluid flow between ports 136 and 138 through passageway 170.

Figure 4A:
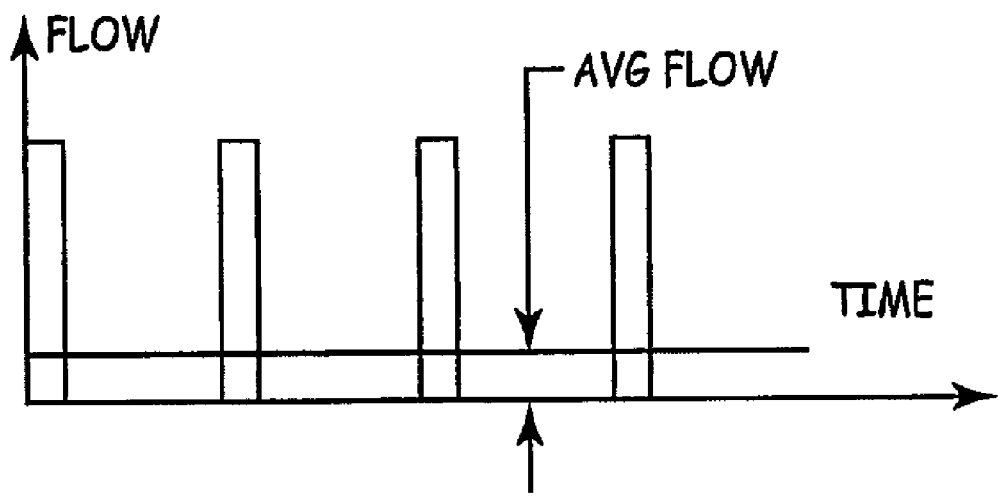
FIG. 4A is a graph of flow versus time for the fluidic valve of FIGS. 2A and 2B in which the rotatable valve spool is in a first linear position.

FIG. 4A is a graph of flow versus time for this configuration. As shown in FIG. 4A, a series of relatively narrow flow pulses are provided with the valve being mostly off between each pulse. This provides a relatively small average flow level.

Figure 4B:
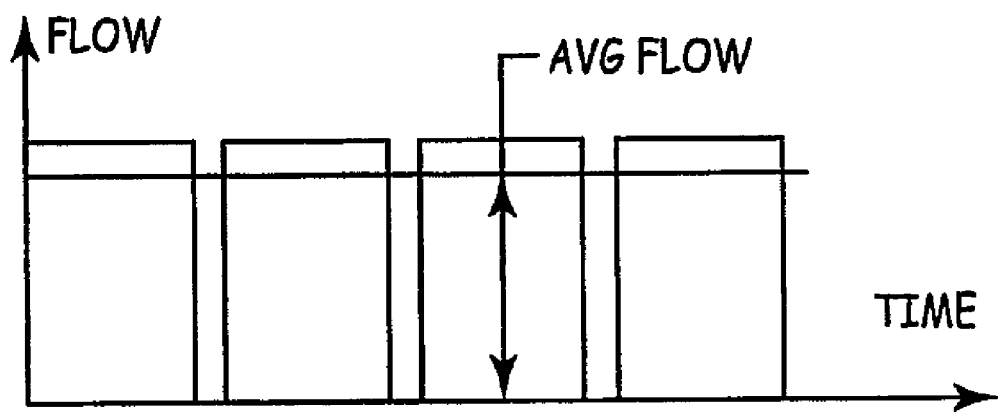
FIG. 4B is a graph of flow versus time for the fluidic valve of FIGS. 2A and 2B in which the rotatable valve spool is in a second linear position.

Returning to the configuration shown in FIG. 2B, the spool 134 is shown positioned further within cylinder 130. In this configuration, as spool 134 rotates, the ports 136 and 138 will reside for a greater period of time in the fluid flow region 168 of spool 134 than they will in the fluid blocking region 166. FIG. 4B is a graph of flow versus time for this arrangement. As illustrated in FIG. 4B, the flow comprises a series of relatively long flow periods with brief flow blocking periods in between each peak. This results in an average flow which is almost as great as the level of the individual peaks, and much greater than the average flow level shown in FIG. 4A. Thus, as illustrated above, the period of the pulses can be controlled by adjusting the rotation speed of rotary driver 144, while the width of the individual pulses can be controlled by adjusting the linear position of the spool 134 within the cylinder 130 using linear driver 146. Further, the relationship between linear position and pulse width can be controlled by changing the shape of the variable blocking features 160. As illustrated in FIG. 3, the variable blocking features 160 have a profile which is dependent upon both the angular position along the circumference of spool 134 as well as the linear position along the axis of spool 134.

Figure 5:
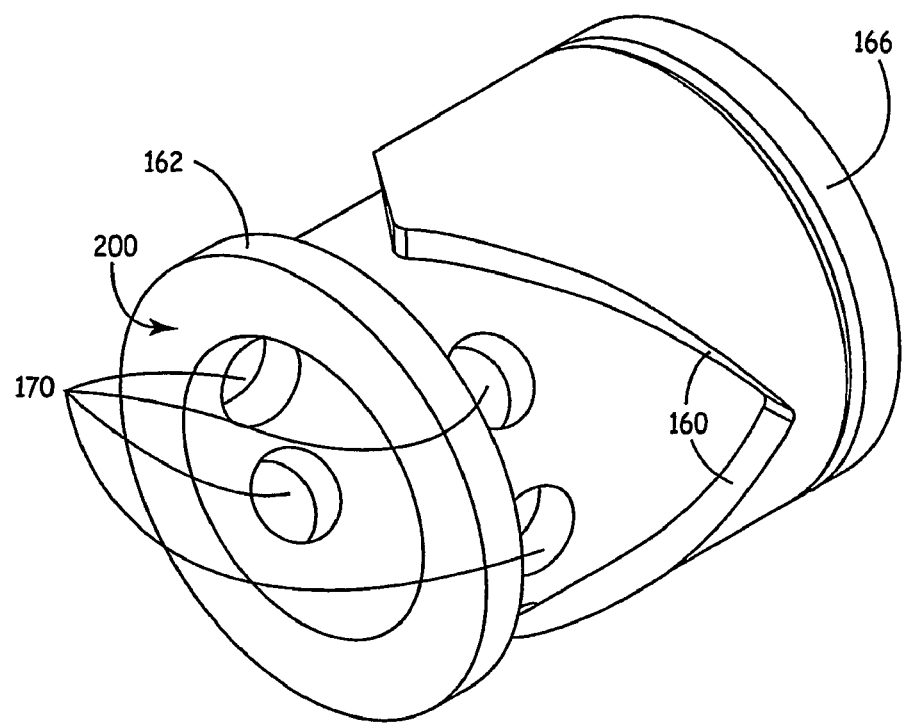
FIG. 5 is a perspective view of another configuration of a rotatable spool.

FIG. 5 is a perspective view of another configuration of a spool 200. In the configuration of FIG. 5, the variable blocking feature 160 is formed as a step change in the outer surface of the spool 200. Such a configuration may be easier to manufacture and provide greater blocking abilities in comparison to that shown in FIG. 3. However, spool 134 shown in FIG. 3 provides less surface area against the wall of bore 132 and therefore should provide lower journal friction.

Figure 7A:
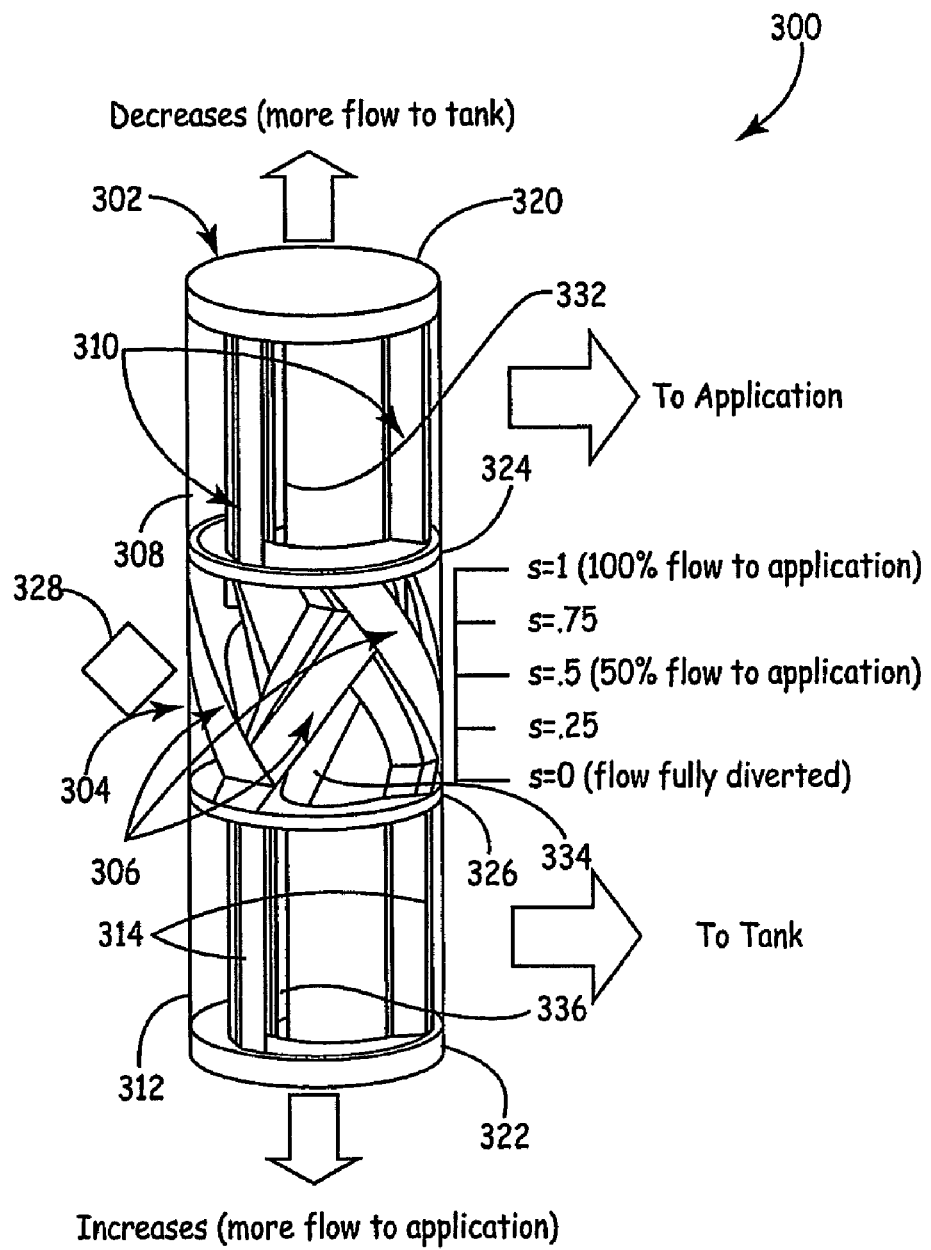
FIG. 7A is a perspective view, 7B and 7E are cutaway views of FIGS. 7C and 7D are cross-sectional views which show a self-spinning spool in accordance with one embodiment of the present invention.

A self-spinning, 3-way rotary on/off valve 300 is illustrated in FIG. 7A. In contrast to a 2-way valve, a 3-way valve sends inlet flow to one of two branches. Valve 300 is formed by a spool 302 and consists of a central pulse width modulated inlet turbine section 304 which includes a plurality of helical barriers/inlet turbine blades 306. The central section 304 is located between an application outlet turbine section 308 having turbine blades 310 and a tank turbine section 312 having blades 314. The ends of spool 102 are sealed with seals 320 and 322. Further, a seal 324 separates portion 308 from portion 304 while a seal 326 separates central portion 304 from portion 312. The spool 302 is at least partially hollow and provides passageways between spool central inlets 330 and spool application outlets 332 as well as passageways between spool central inlets 334 and spool tank outlets 336.

The valve spool consists of a central PWM section 304 sandwiched by two outlet turbines 308,312. The central section 304 contains alternating helical barriers 306 overlayed onto the spool surface. The helical barriers 306 partition the spool 302 into regions where flow is directed to the application (on) or to tank (off). As the spool rotates, the inlet nozzles 328, which are stationary on the valve sleeve (not shown in FIG. 7A), transition across the barriers and alternate the flow path between application and tank. The duty ratio, or proportion per PWM cycle that the flow is directed to the application, is controlled by changing the axial position of the spool 302. By translating the spool 302 upward relative to the inlet, the inlet will remain connected to the tank region for a greater portion per rotation of the spool 302. This decreases the duty ratio. The opposite effect will occur if the spool is translated downwards relative to the inlet.

Figure 7B:
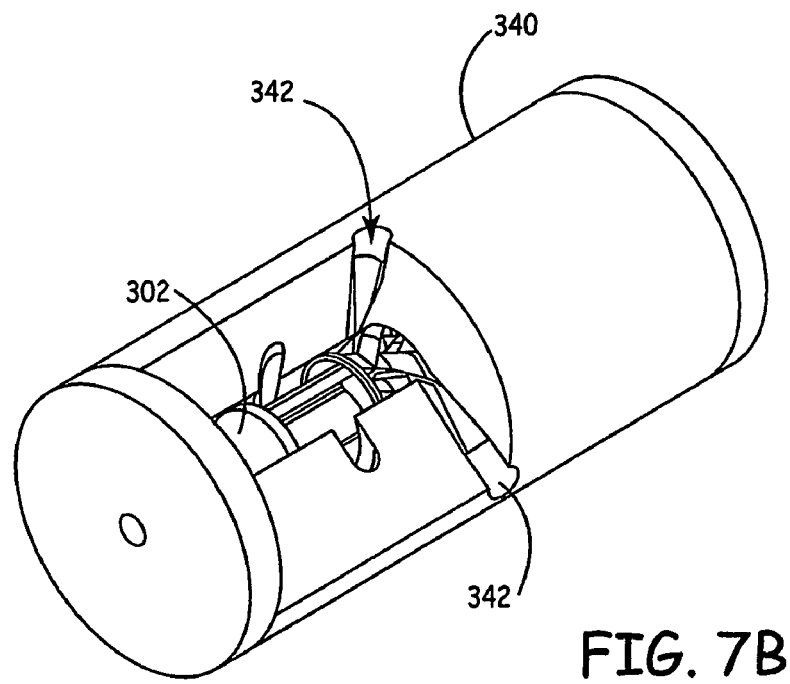
Figure 7C:
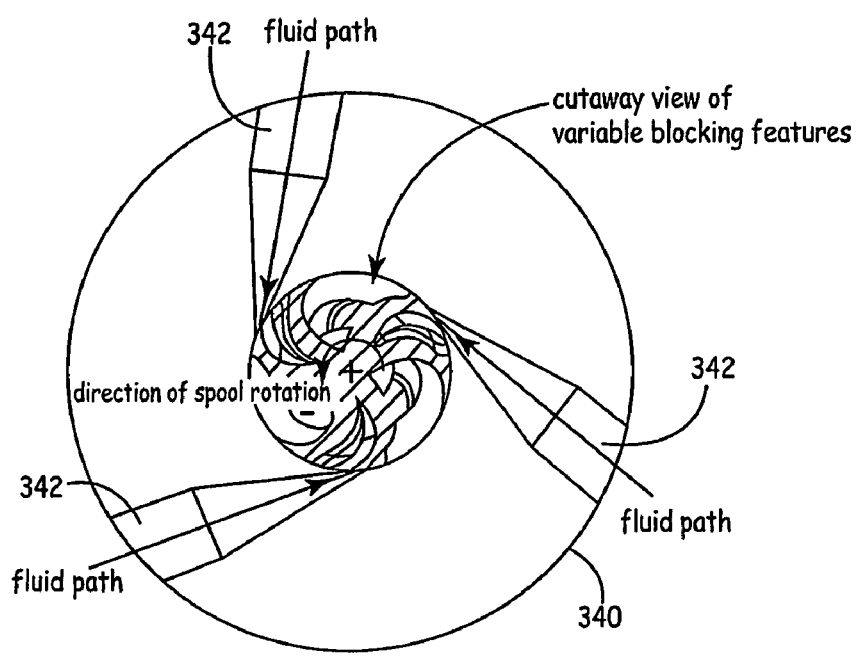

The inlet turbine region 304 implements an impulse turbine between the fluid stream and the variable blocking features 306. Its operation is clarified in FIG. 7B and FIG. 7C. FIG. 7C is a cross-sectional view and illustrates how fluid entering the valve spool impacts the variable blocking features 306 at high velocity. The impulse force created by this collision creates a torque about the center of the spool which causes it to rotate. More specifically, the angular momentum of the tangentially oriented inlet flow is captured by the blocking features as the fluid flows radially inwards towards the center of the spool. FIGS. 7B and 7C show one example sleeve or housing 340 and illustrates the geometry of inlet ports 342 to the self-rotating spool. The number of inlet ports is the same as the number of regions ported to the load (or tank). The ports are spaced at circumferentially equal increments about the periphery of the center section of the spool.

Fluid is injected into the ports 342 from a supply pump. Ports 342 are rhombus shaped to minimize transition time. However, other non-optimal inlet port shapes can be used, such as simple circle. The area of the port decreases as the port approaches the inside wall of the sleeve 340, so its velocity and angular momentum about the center of the spool increase. The high velocity fluid then impacts the rotating variable blocking features 306. The impulse force created by this impact creates a torque about the center of the spool 302 which causes it to rotate. The fluid exits the spool through the center region to one of the outlet turbine regions 308,312.

As the fluid flows towards the center of the valve spool 302, the curvature of the inlet turbine blades 306 causes the fluid to change direction. The momentum of the fluid produces a force on the blades as it changes direction. This force creates torque which also tends to rotate the spool 302.

Figure 7D:
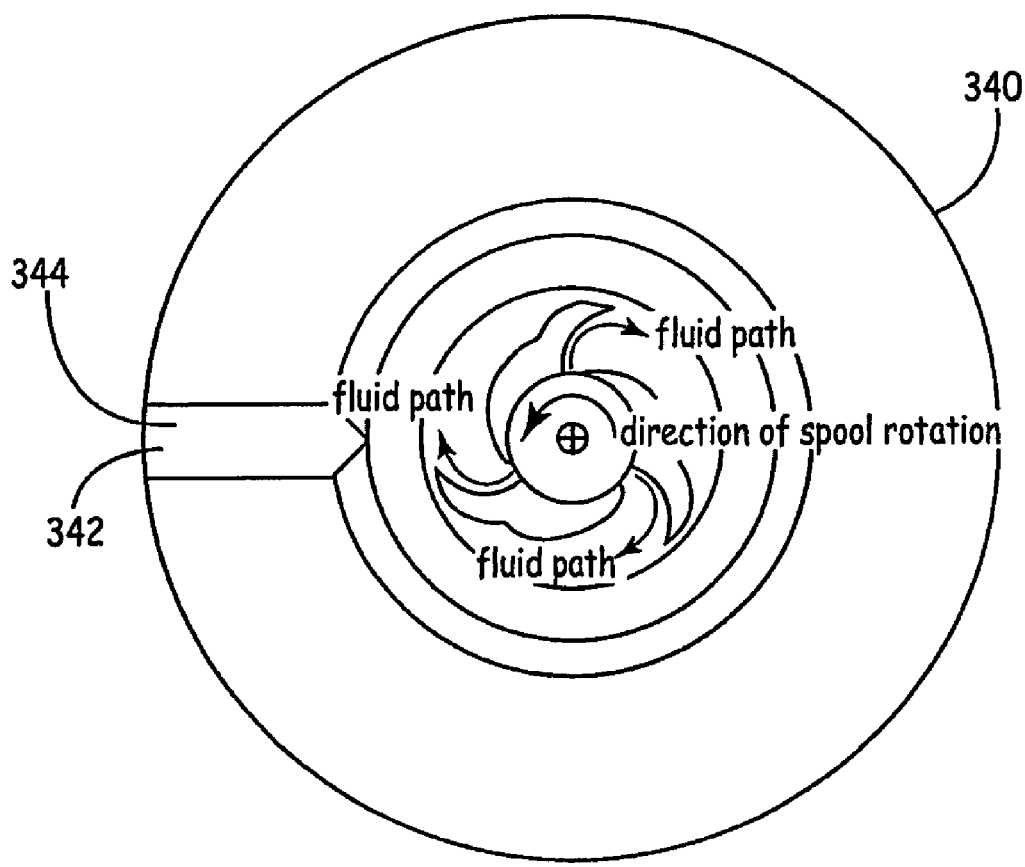
Figure 7E:
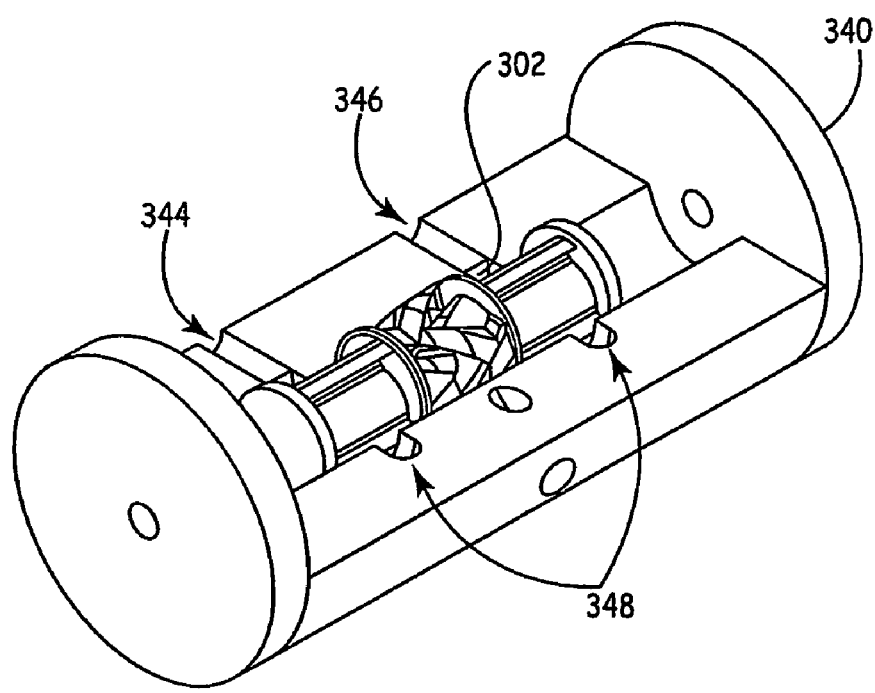

The output turbine implements a reaction turbine on fluid exiting the valve from either the load or tank sides. Its operation is illustrated in FIG. 7D and FIG. 7E. In FIG. 7D, fluid flows from the center to the periphery of the spool 302. The blades in the spool force the fluid to change direction. The reaction force developed by the fluid flowing over the blades 310,314 creates a torque which rotates the spool.

FIG. 7E is a view of spool 302 in sleeve 340 showing the configuration of the outlet turbines 310,314 and outlet ports 344 and 346. The top half of the sleeve 340 has been cut away across the centerline to expose the outlet ports and outlet pressure rails 348.

FIG. 7D shows how fluid exits the spool by flowing from the center of the spool to the outer periphery. As the fluid flows outward, its direction is shifted by the blades 310,314 of the outlet turbine. The fluid momentum creates a force against the blades 310,314 as its direction is changed. This force creates a torque about the center of the spool which causes the spool 302 to rotate.

FIG. 7E shows how the fluid is ported out from the outlet turbines through the sleeve 340. The fluid feeds into a pressure rail 348 in the sleeve 340 which surrounds the outlet turbine. The outlets 344 can also be oriented tangentially for maximal outlet reaction turbine effect. The pressure rail 348 is ported at one circumferential position to carry the fluid to the tank or load.

FIG. 7E also shows the outlet turbines having an axial length several times the width of the outlet pressure rails 348. This allows the outlet turbines to continue to communicate fluid to the pressure rails as the axial position of the spool 302 is changed, as is required to change the duty ratio of the valve. However, the valve can also be constructed by reducing the axial length of the outlet turbines to a narrow slot, then increasing the axial length of the outlet pressure rails to several times the width of the slot. Protrusions could also be included in the outlet pressure rails to gain some impulse turbine effect.

A self spinning valve could be constructed using only inlet turbines or only outlet turbines or both. Utilizing both maximizes the rotational velocity of the spool. The self-spinning design is further enhanced by the 3-way configuration of the valve 300. The 3-way design continuously feeds fluid through the valve spool 302 regardless of whether the flow is directed to application or tank. This allows the spool to rotate at full speed regardless of duty ratio. When combined with a 4-way directional valve, the 3-way functionality of spool 302 allows the system to operate as both a pump and as a motor.

The valve is packaged as an integrated pump cover/sleeve that can be bolted directly onto existing fixed displacement pumps. This integrated packaging allows the switched inlet volume between the pump and valve to be minimized, thus reducing energy loss due to fluid compressibility. A more detailed view of a valve assembly 350 is shown in FIGS. 8 and 9.

Figure 8:
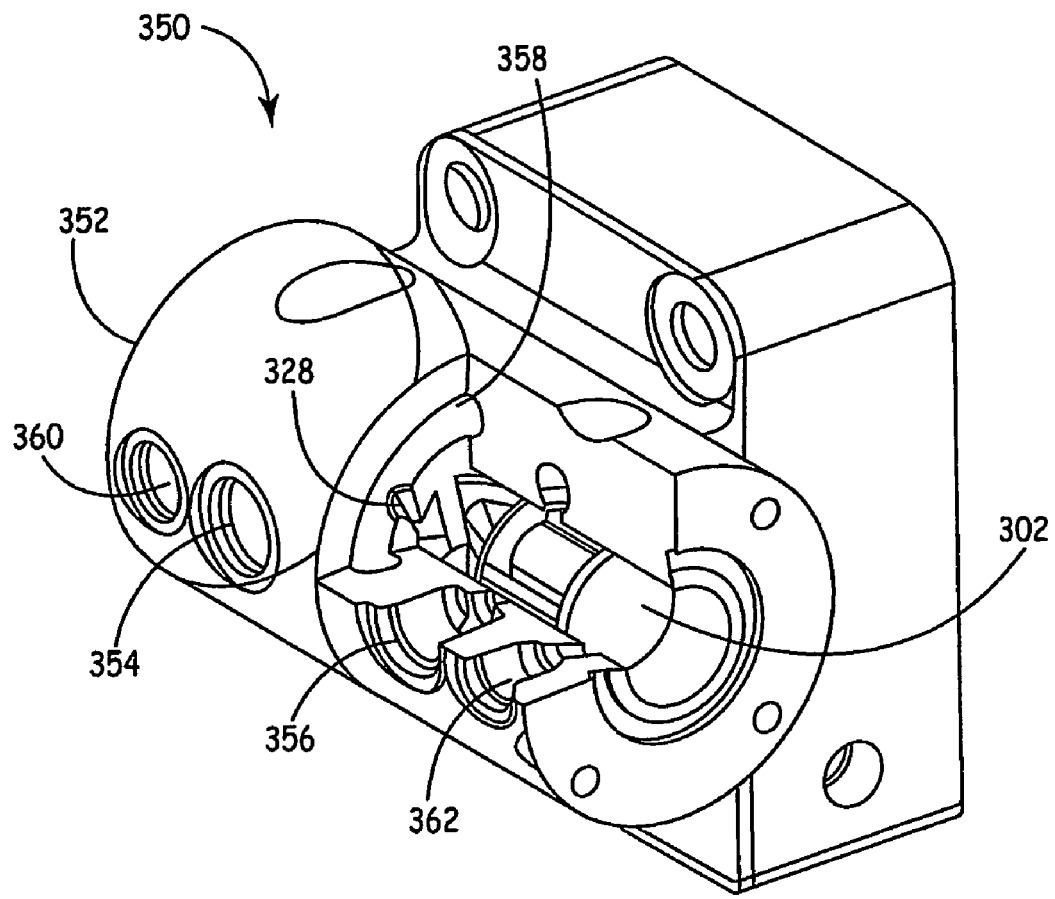
FIG. 8 is a partial cutaway view.
Figure 9:
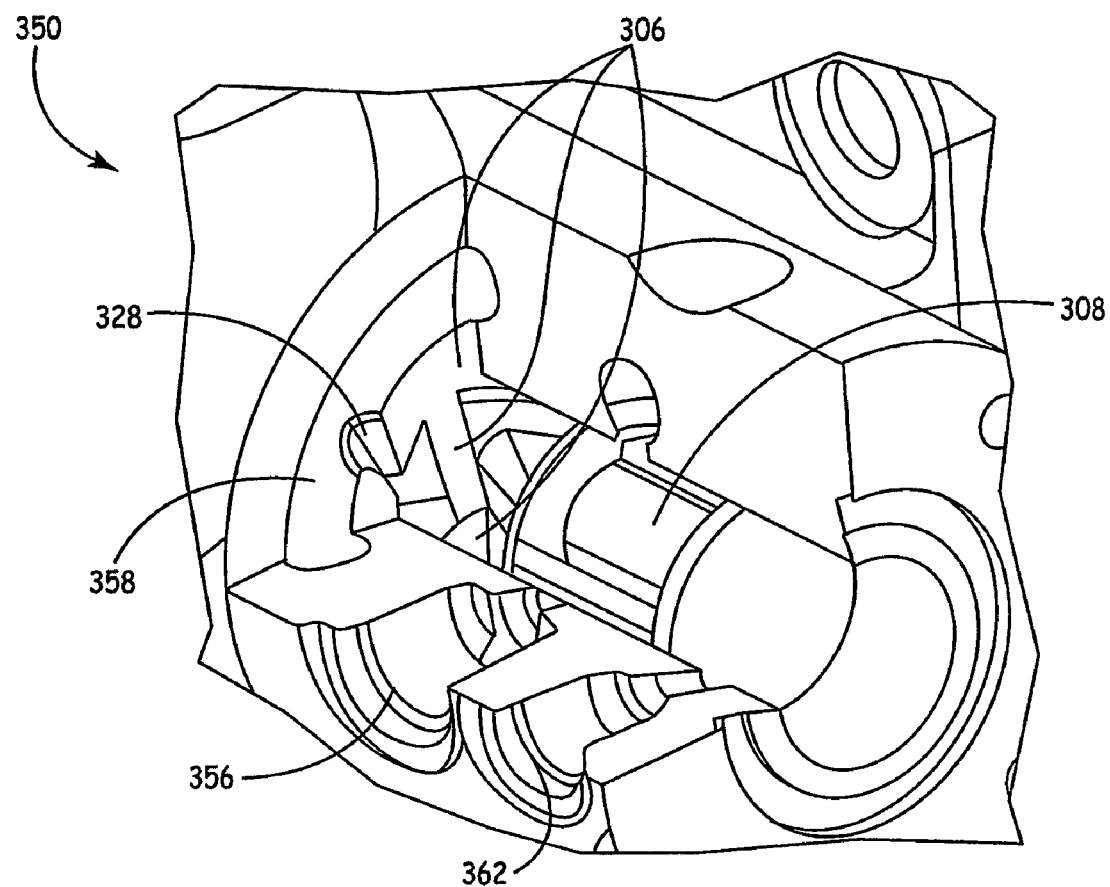
FIG. 9 is an enlarged cutaway view of a valve assembly using the spool of FIG. 7.

FIG. 8 is a partial cutaway view of valve assembly 350 and FIG. 9 is an enlarged view of the cutaway portion of valve 350. As illustrated in FIGS. 8 and 9, the spool 302 is carried in a sleeve 352. Sleeve 352 includes sleeve outlets 354 and 356 and sleeve inlet conduit 358 which couples to sleeve inlet nozzle 328. Sleeve 352 also includes linear positioning ports 360 and 362.

Figure 10:
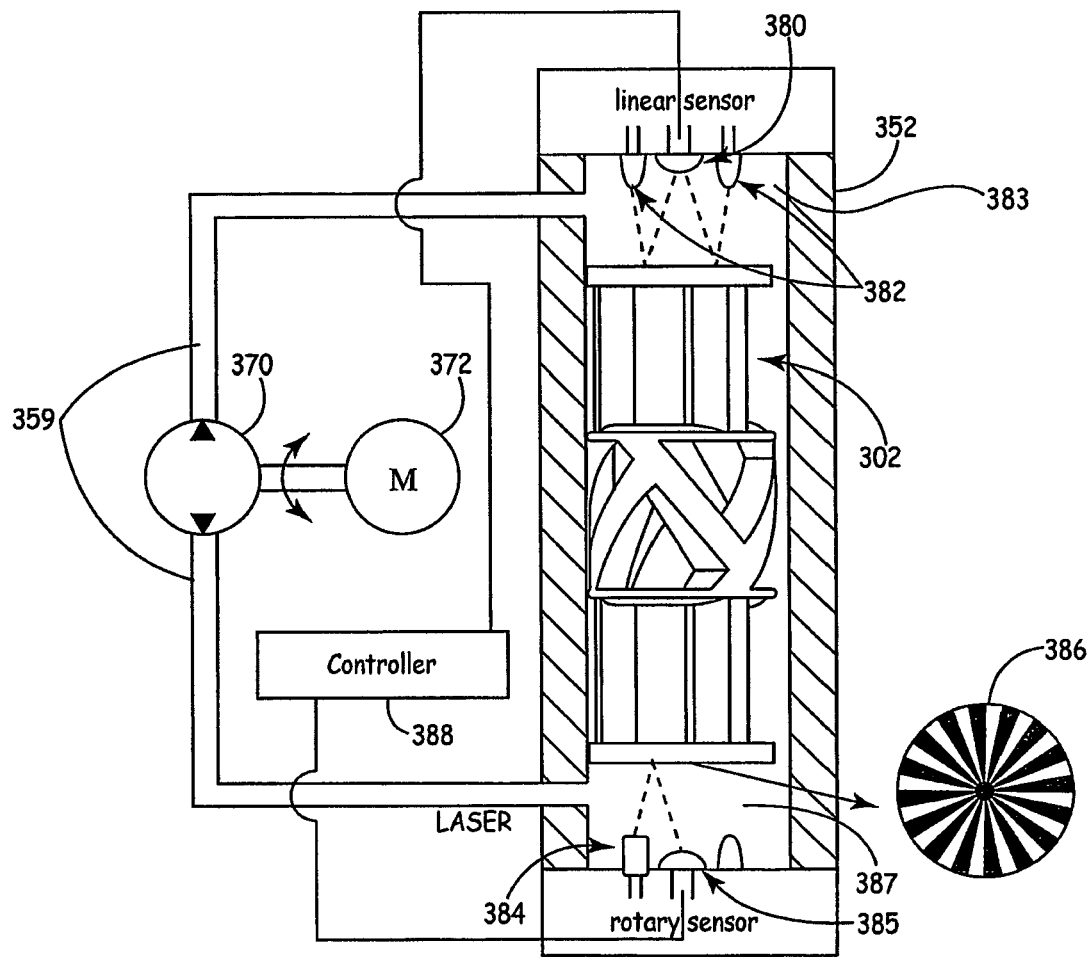
FIG. 10 is a simplified cross-sectional view showing the spool in a sleeve and controlled by a controller.

Turning now to another aspect of the present invention, FIG. 10 is a simplified block diagram showing a pump 370 coupled to a motor 372. The valve spool 302 has a solid face on each of its axial ends. These faces form a bottom fluidic chamber 383, and a top fluidic chamber 387, with the ends of the valve sleeve 352. The chambers are connected to a small two-way pump 370 through fluid passages or conduits 359. The two-way pump is driven by a small reversible motor 372.

The axial position of the spool 302 is set by pumping fluid between the chambers 383 and 387. For example, assuming a valve geometry as shown above, the duty ratio of the valve can be increased by pumping fluid from chamber 387 to chamber 383. Similarly, the duty ratio can be decreased by pumping fluid from chamber 383 to chamber 387.

The fluidic positioning system eliminates the need for a mechanical coupling to the spool to set its axial position. This is beneficial because the spool has two degrees of freedom: pulse width modulating action is gained by rotation of the spool, and the duty ratio is set by axial positioning of the spool. Mechanical linkages must allow for both degrees of freedom. This typically complicates sealing to them at points where they must exit the fluid chambers.

Also illustrated in FIG. 10 are position and angle sensors. One example position sensor includes a photo diode 380 which detects reflections from the spinning spool 302 from light generated with light sources 382, such as LEDs. Two light sources 382 are provided which generate light which is reflected from one end of the spool 302. The intensity of the reflected light is detected by a light sensor 380, such as a photo diode, and is related to the axial position of the spool 302 within the sleeve 352. One example angle detector includes a directed light source 384, such as a laser, which provides a beam reflected off spool 302 to a light sensor 385, such as a photo diode. In such a configuration; the ends of the spool 302 can provide an optically encoded surface 386, for example, a wheel with light and dark spaces. A controller 388 is coupled to light sensor 385 and motor 372 and can be used to monitor the speed of rotation of the spool 302 based upon the outputs from the light sensor 385 and control the linear position of the spool 302 within the sleeve 352 by actuating motor 372 and thereby controlling gerotor pump 370.

The axial position of the spool 302 is actuated using a pump 370 that is fluidically connected to both ends of the valve sleeve 352. The motor 372 is powered by a controller 388. By pumping fluid from one end of the sleeve 352 to the other, the axial position of the spool 302 can be varied. The pump 370 flow rate is statically related to the input to the motor driving circuit.

The axial position of the spool 302 is measured using a non-contact optical method. A sensor plate with light sources 382 and a light sensor 380 is mounted to one end of the valve sleeve. The light emitted from the light sources 382 is reflected off of the surface of the valve spool 302 and sensed by the light sensor in the sensor plate. The light intensity detected by the light sensor 380 decreases as the distance between the photodiode and spool 302 surface increases. Therefore the position of the spool can be measured from the output voltage of the light sensor.

The rotary position and angular velocity of the spool 302 are measured using a similar method to that used for linear sensing. A code wheel 386 with many sectors (32 shown) is attached to one end of the spool 302. A light source 384, such as a low-power diode laser, and a light sensor 385, such as a photodiode, are mounted to a sensor plate, which is attached to one end of the sleeve 352. The intensity of the reflected light varies significantly with the position of the code wheel. This light intensity is detected by the light sensor 385 and is transformed into a proportional voltage signal. A counter is used to store the voltage information, from which the spool velocity can be calculated by controller 388. A reference is added to one sector to reset the counter for determining the spool's absolute rotary position.

Figure 11:
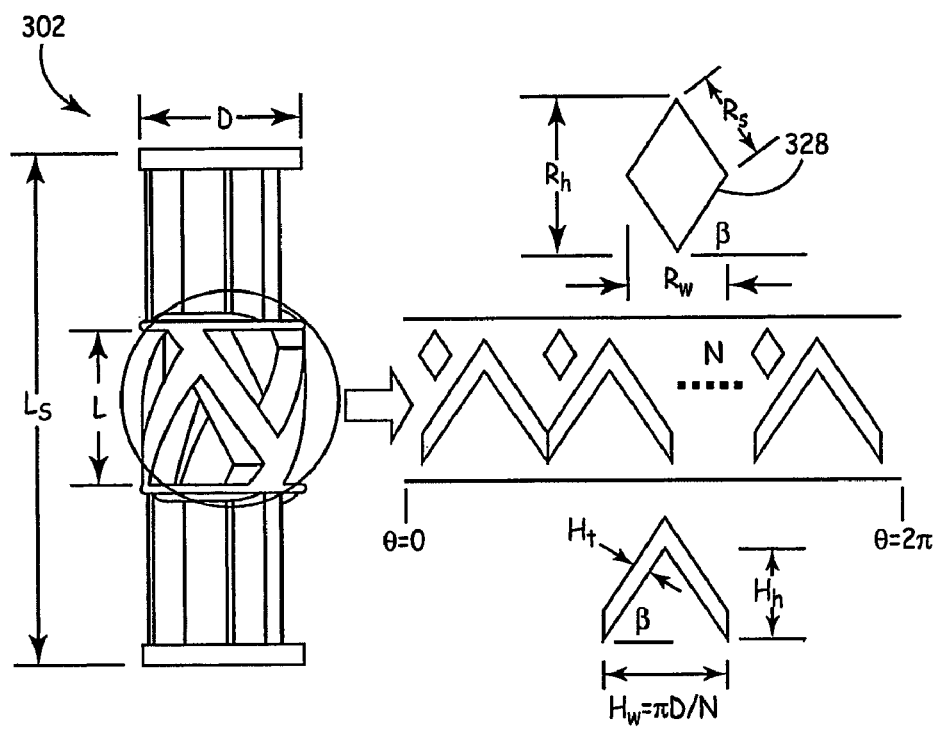
FIG. 11 illustrates geometry of the spool.
Figure 12:
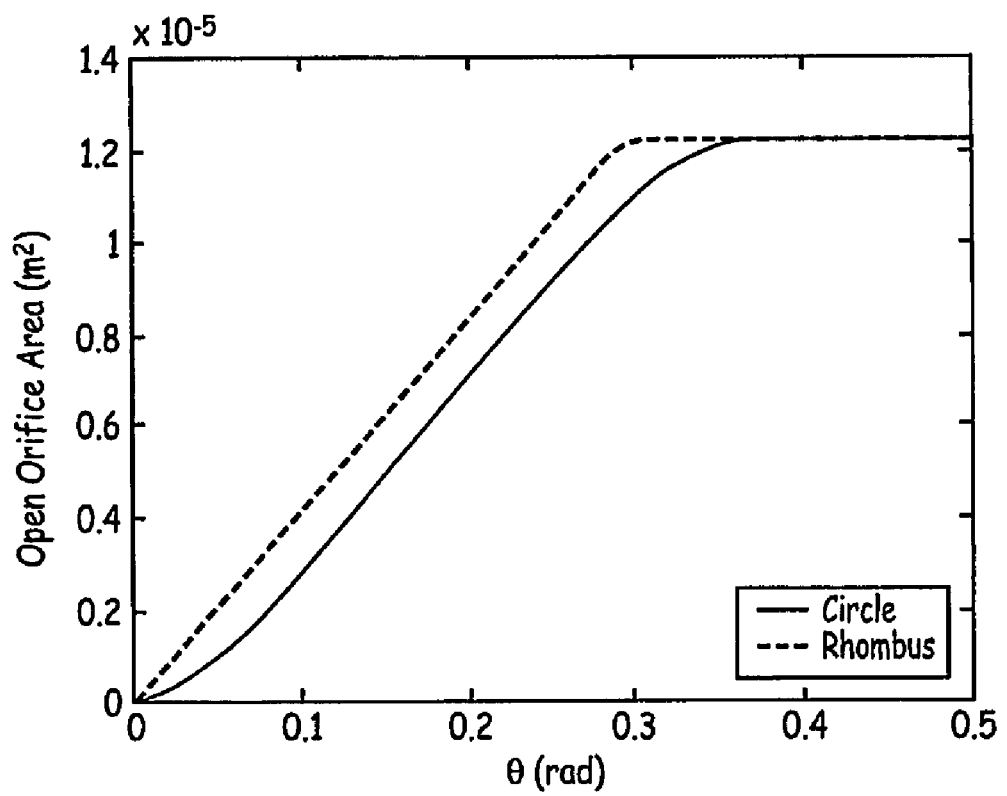
FIG. 12 is a graph of the open orifice area versus angle for inlet port geometries of a circle and a rhombus.

A more detailed diagram of the valve spool 302 is illustrated in FIG. 11. FIG. 5 illustrates the geometry of the central PWM section of the self-spinning 3-way valve unwrapped from the spool surface. The helical barriers unfold into a triangular sawtooth partition. As the barriers translate across the inlets, fluid is directed from one branch (application or tank) to the other. A description of the relevant design parameters for the spool geometry is given in Table 1, below. A rhombus shaped inlet orifice was selected with sides $R_s$ that match the helix angle $\beta$. The rhombus is shaped so that the sides are parallel to the helical barriers. As shown in FIG. 12, a rhombus shaped inlet provides a faster rate of change in area $$\left(\frac{dA}{d\theta}\right)$$

during the initial and final stages of transition than a circular orifice of equal size. These are the regions where quick transitions are desirable since most throttling losses occur when the inlet orifice is just beginning to open or close. Note that the area gradient $$\left(\frac{dA}{d\theta}\right)$$

is constant for a rhombus shaped inlet.

TABLE 1

| Parameter | Description |
|---|---|
| D | Spool diameter |
| R | Spool diameter, $R = \dfrac{D}{2}$ |
| $L_s$ | Spool length |
| L | PWM section length |
| $R_h$ | Rhombus height |
| $R_w$ | Rhombus width |
| $R_s$ | Rhombus side length, $R_s = \dfrac{1}{2}\sqrt{R_w^2 + R_h^2}$ |
| B | Helix angle |
| $H_h$ | Helix height |
| $H_w$ | Helix width |
| $H_t$ | Helix thickness |
| N | Number of helices |

Figure 13:
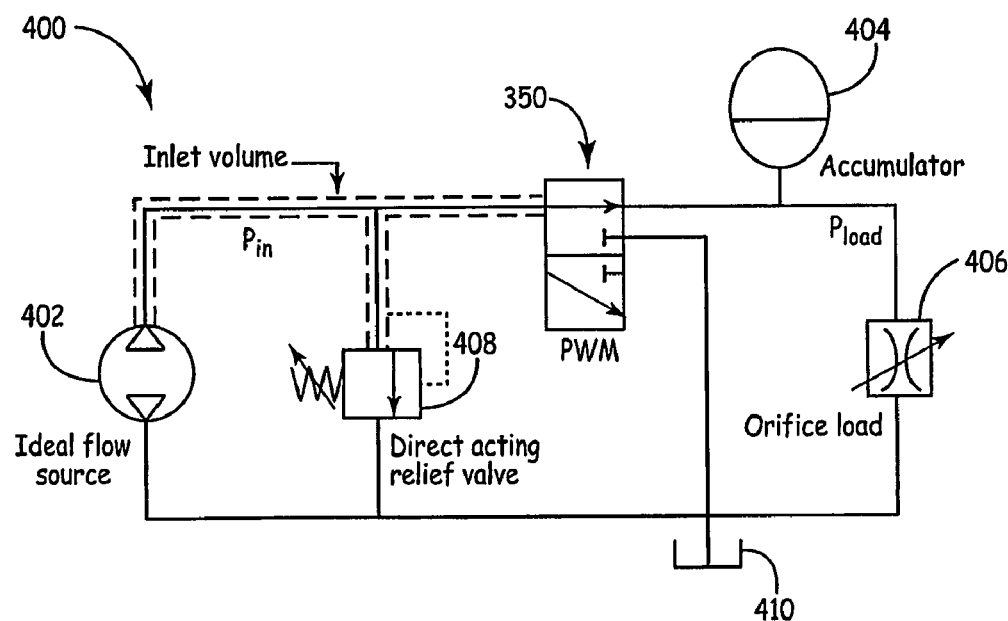
FIG. 13 is a hydraulic circuit diagram of a pulse width modulated (PWM) variable displacement pump.

FIG. 13 is a circuit diagram 400 of a pulse width modulated (PWM) variable displacement pump using the rotary three-way valve 350. The circuit 400 includes an ideal flow source 402, an accumulator 404 and orifice load 406, a direct acting relief valve 408 and a reservoir 410. During operation, the spool of valve 350 is continuously spinning and fluid is either provided to orifice load 406 or recirculated to the ideal flow source 402 bypassing load 406.

In the following analysis, it is assumed that the system has flow rate Q, relief valve set at $P_{relief}$, and a constant application or load pressure of $P_{load}$. $P_{in}$ is defined as the pressure in the inlet volume, which is the volume upstream of the valve. The sizing of the inlet rhombus orifice $A_{in}$ and outlet turbine exit $A_{out}$ represent a direct trade-off between the spool rotational velocity, valve transition time, and fully-open throttling losses. $\Delta P_{open}$ is defined to be the pressure drop across the rhombus inlet when it is fully open, and $\Delta P_{exit}$ to be the pressure drop across the outlet turbine exit. When $\Delta P_{open}$ or $\Delta P_{exit}$ is large, more kinetic energy is transferred to the fluid resulting in a higher spool velocity. This speed, however, is attained at the cost of greater throttling losses. In this design, the inlet orifice area $A_{in}$ and the outlet turbine exit area $A_{out}$ are sized such that the fully open throttling loss does not exceed a maximum acceptable value. Since the flow rate Q of the system is constant, the maximum throttling loss limits the pressure drop across the inlet and outlet stages, which determines $A_{in}$ and $A_{out}$. The maximum fully open throttling loss is given by Power=$(\Delta P_{open}+\Delta P_{exit})\cdot Q$. $A_{in}$ and $A_{out}$ can be calculated using the orifice equation, which is defined as $$\Delta P = \frac{\rho}{2}\left(\frac{Q}{C_d \cdot A \cdot N}\right)^2 \qquad \text{Eq. (1)}$$

ρ is the density of hydraulic oil, $C_d$ is the orifice discharge coefficient, and A is the cross-sectional area of interest.

Figure 14:
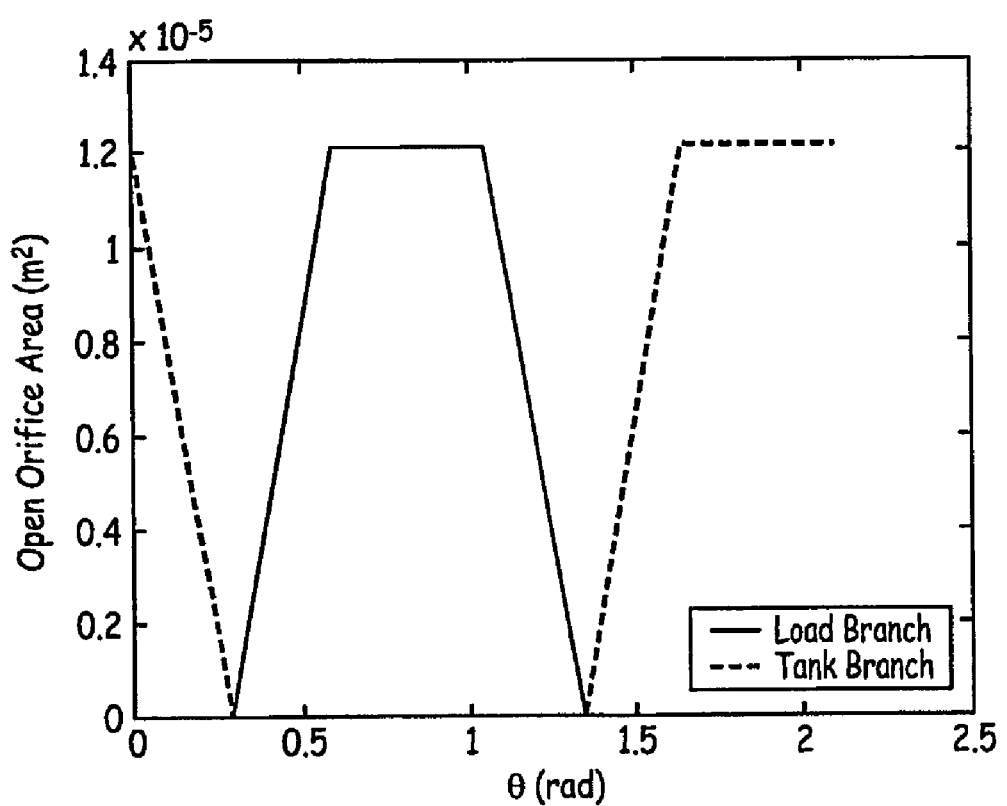
FIG. 14 is a graph of open orifice area versus angle.
Figure 15:
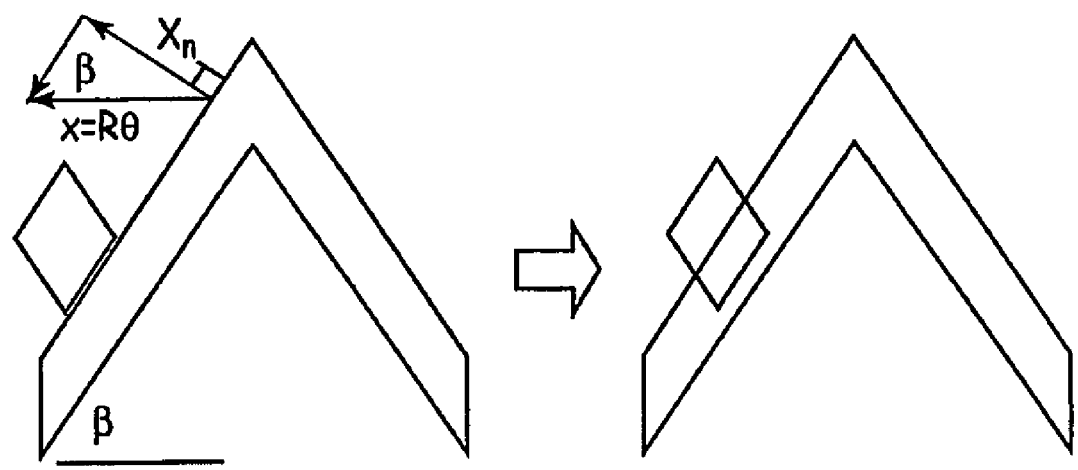
FIG. 15 illustrates the change in area of the inlet port having a shape of a rhombus during transition.

With the rhombus area specified, the height h and width $R_w$ of the rhombus are constrained by $A_{in}=0.5\cdot R_w\cdot R_h$. From FIG. 14, four transition events occur every PWM cycle: opening and closing of the inlet to the load branch, and opening and closing to the tank branch. Two transition events occur when the inlet pressure transitions from $P_{open}$ to $P_{relief}$, the relief valve pressure. FIG. 15 shows the change in rhombus area during transition. First, the inlet is initially fully open to the tank branch of the circuit. As the inlet begins to close, the pressure at the inlet increases until the pressure reaches $P_{relief}$ and the relief valve opens. Prior to the relief valve opening, the full flow rate Q is sent to tank. Once the relief valve opens, Q is distributed between tank and relief. When the inlet becomes completely closed to tank, the full flow is sent through the relief valve. At this point, the inlet begins to open to the load branch. Flow is divided between load and relief until the inlet area becomes large enough such that the inlet pressure falls below the relief pressure. When this occurs, the full flow is sent to the load. The transition events from $P_{relief}$ to $P_{open}$ occur in a similar manner. The proportion of time that the valve is in transition is given by:

$$\kappa = \frac{4\cdot N \cdot R_w}{\pi \cdot D} \qquad \text{Eq. (2)}$$

$0\cdot\kappa\leqq1$. $R_w$ is constrained such that $0\cdot\kappa\leqq1$ while $R_h$ is constrained by the length of the PWM section of the spool, or $R_h<L$. Ideally, ic must be small to minimize proportion of each PWM cycle that the valve is in transition. Since the valve is least efficient during transition, decreasing κ will increase the efficiency of the valve. κ can be decreased by setting $R_w$ to be small, or D to be large. Both cases, however, increase the surface area of the spool, which increases viscous friction and decreases the spool velocity.

Figure 16:
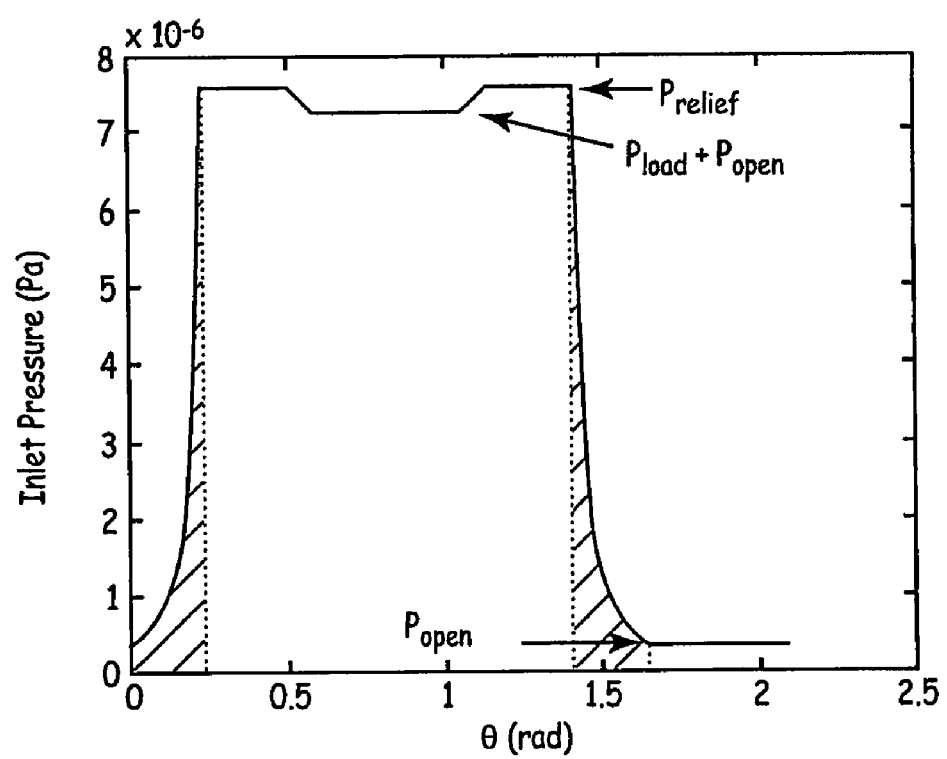
FIG. 16 is a graph of inlet pressure versus angle.
Figure 17:
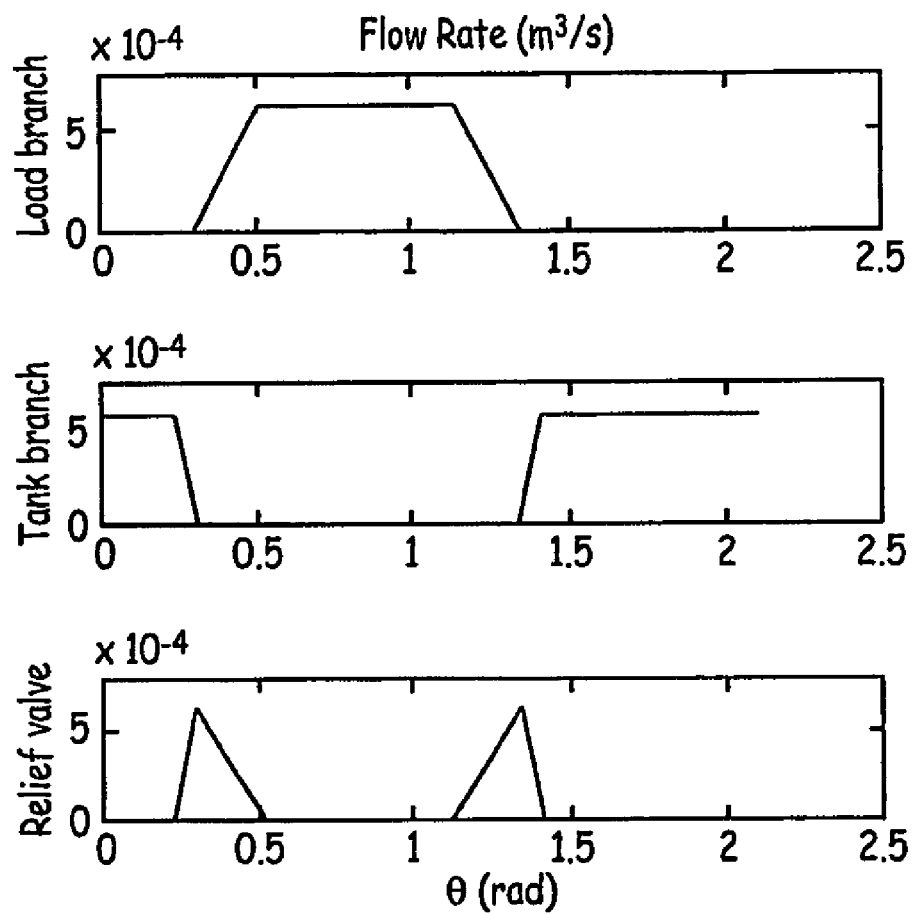
FIG. 17 shows flow rate through the valve for one pulse width modulated period for a load branch, tank branch and relief branch of the circuit of FIG. 13.
Figure 18:
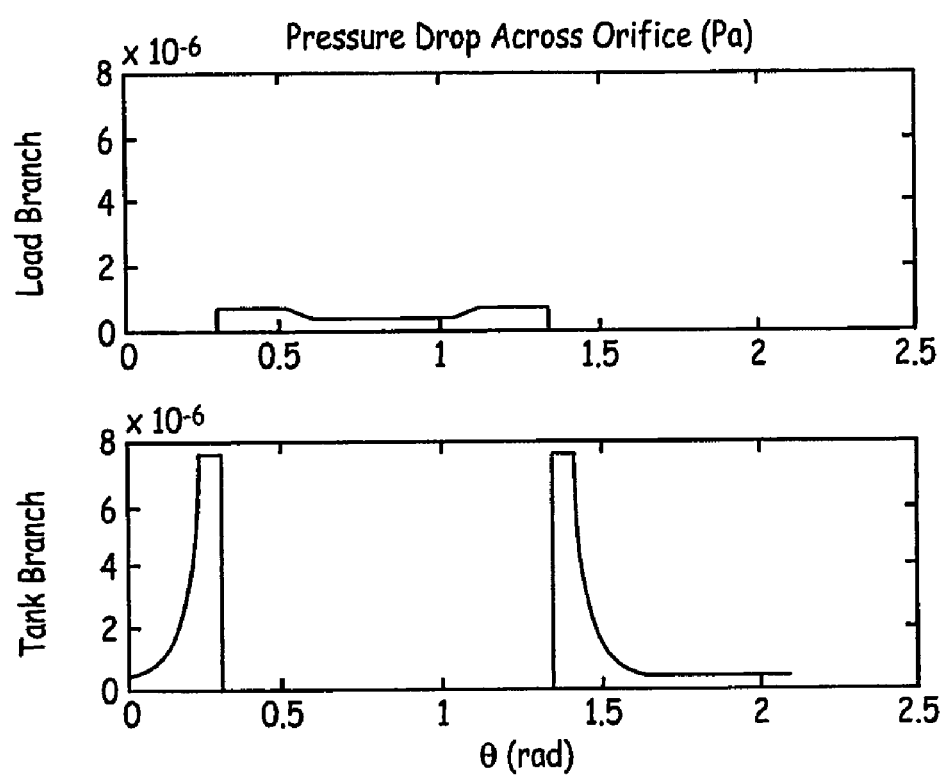
FIG. 18 is a graph illustrating pressure drop across an inlet orifice for the load branch and tank branch of FIG. 13.
Figure 19:
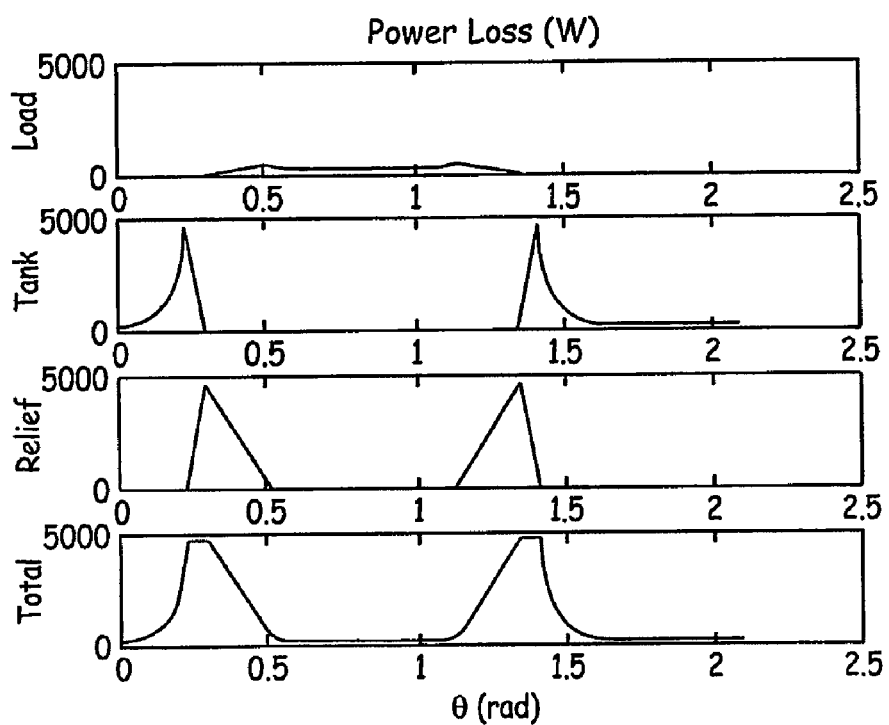
FIG. 19 is a graph showing transition power loss versus angle for one pulse width modulated period for the relief branch, tank branch, load branch and total for the circuit of FIG. 13.

During transitions from on to off, the valve will experience throttling losses across the inlet orifice in addition to the fully open losses. This is because to the valve cannot open and close instantaneously. The throttling losses can be computed by calculating the pressure drops and flow across the valve in each flow branch and of the relief valve. The throttling loss is the product of the pressure drop and the flow through the valve. FIGS. 16 and 17 illustrate the inlet pressure and flow profiles corresponding to the area plots shown in FIG. 14. The shaded region in FIG. 16 at the beginning and end of the PWM cycle illustrate the transition losses. The pressure drop across the inlet orifice is shown in FIG. 18. The power loss during transition can be found by multiplying the curves in FIGS. 17 and 18. The result is shown in FIG. 19, which reveals that a majority of the energy loss during transition occurs when the relief valve opens and during the two tank transition events.

Figure 20:
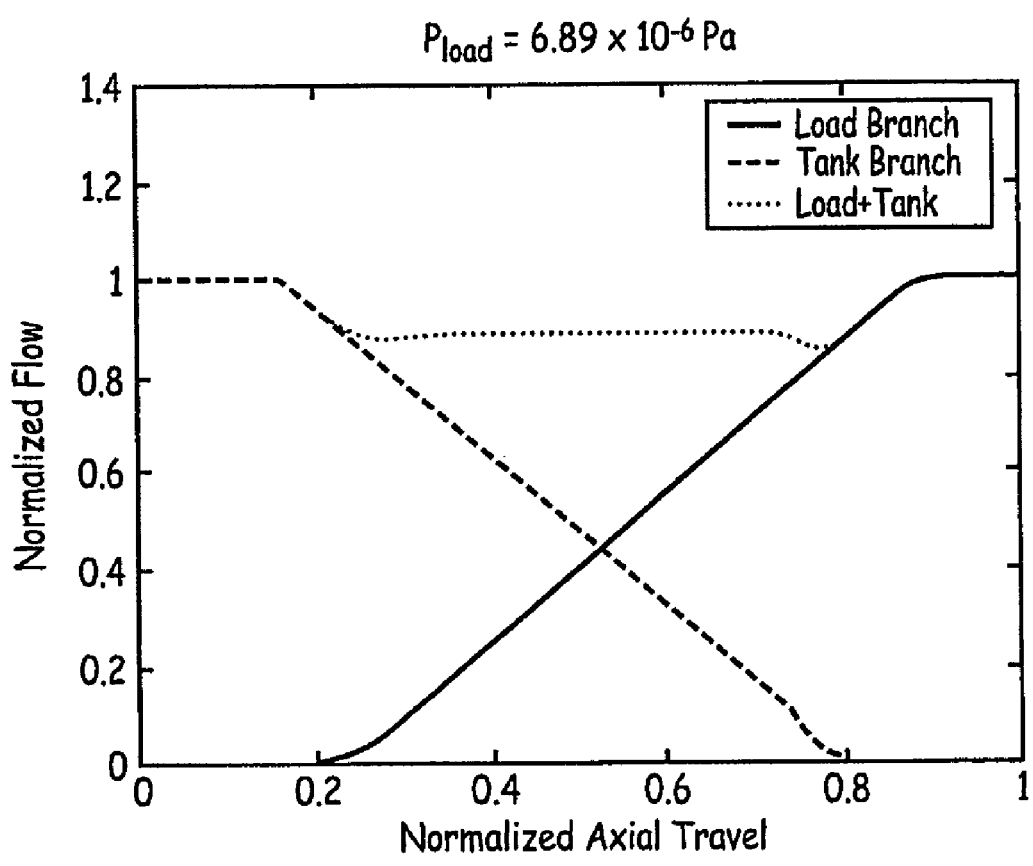
FIG. 20 is a graph of normalized flow versus normalized axial travel.

The relationship between flow to the load and tank branches with respect to the axial displacement was determined numerically using a numerical model. The results are shown in FIG. 20. The central portion of FIG. 20 is linear, which is expected given the linear nature of the helical barrier shown in FIG. 11. Toward the two extremes of the axial travel the flow levels off. This is when the full flow is directed to either load or tank and the inlet does not overlap the barriers at all. In between the linear and level portions of the curve exist nonlinearities, which occur due to the junctions where the barriers intersect. Note that $Q_{load}+Q_{tank}$ Q due to flow through the relief valve during transition. The total flow, $Q_{load}+Q_{tank}$, in the linear range of the axial travel between 20% 80%, is especially low (about 90%) due to the relief valve opening during transition, which indicates a significant source of energy loss. Therefore, minimizing flow through the relief valve is desirable.

The spool rotational velocity was calculated by considering an angular momentum balance on the spool. The analysis assumes incompressible flow and one-dimensional inlets and outlets. The momentum balance yields:

$$J\cdot\ddot{\theta}=\tau_{in}+\tau_{out}-\tau_f \qquad \text{Eq. (3)}$$

J is the mass moment of inertia of the spool and $\ddot{\theta}$ is the angular acceleration of the spool. $\tau_{in}$ is the torque generated by the inlet stage turbine, and $\tau_{out}$ by the outlet stage. In the steady state $\ddot{\theta}=0$ and the angular momentum generated by the inlet and outlet stages of the spool are balanced by viscous friction.

The resistive torque due to viscous friction was assumed to obey Petroff's Law. Petroff's Law presumes that the torque due to friction is proportional to the bearing surface area, shear stress, and the moment arm where the shear stress acts on the system. Thus, the torque due to friction is given by:

$$\tau_f = A_{eff} \cdot \frac{\mu}{c} \cdot R^2 \cdot \omega \qquad \text{Eq. (4)}$$

Figure 21:
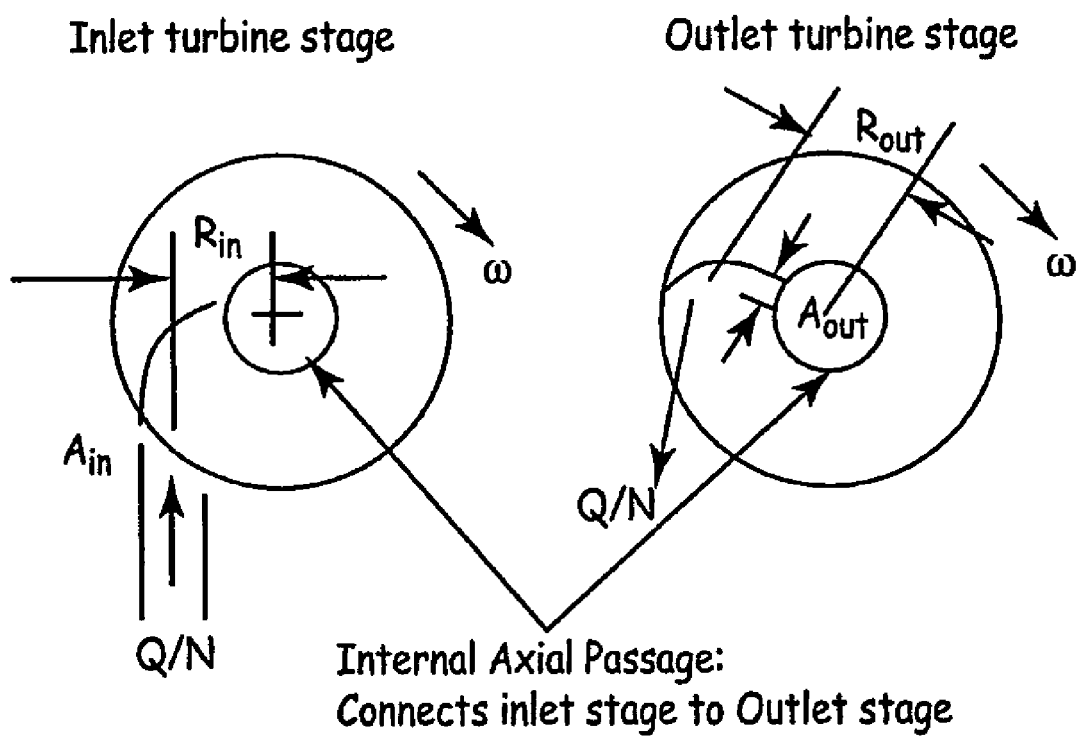
FIG. 21 illustrates inlet and outlet turbine stages.

R is the spool radius, $\mu$ is the dynamic viscosity of hydraulic oil, c is the radial clearance between the spool and sleeve, and $A_{eff}$ is the effective surface area of the spool. The effective surface area of the spool is estimated numerically below. In one current design; the inlet stage of the valve spool has the functionality of an impulse turbine, and the outlet stage a reaction turbine. FIG. 21 illustrate the inlet and outlet turbine stages.

The inlet stage of the valve consists of a stationary inlet nozzle on the valve sleeve tangential to the spool. The inlet is offset a distance $R_{in}$ from the center of the spool. As the high speed fluid enters the spool from the sleeve, it is directed inward toward the center of the spool. The fluid exits the central section of the spool through an internal axial passage. Since the fluid exits the central inlet stage of the valve axially, the fluid is assumed to have no angular momentum as it exits the inlet stage. The torque generated by the inlet stage is calculated by considering the conservation of angular momentum for a control volume around the inlet stage. Since there are N inlets, the total contribution from all inlets is:

$$\tau_{in} = \sum_1^N (R_{in} xv)_{in} \cdot \dot{m}_{in} = \frac{\rho \cdot R_{in}}{A_{in} \cdot N} \cdot Q^2 \qquad \text{Eq. (5)}$$

$\rho$ is the density of hydraulic oil, v is the mean velocity of the fluid as it exits the inlet nozzle, and $\dot{m}$ is the mass flow rate through the nozzle. By equating $\tau_{in}=\tau_f$, the velocity of the spool generated by the inlet stage alone is:

$$\omega = \frac{\rho \cdot Q^2}{N \cdot R^2 \cdot A_{eff} \cdot \frac{\mu}{c}} \cdot \frac{R_{in}}{A_{in}} \qquad \text{Eq. (6)}$$

The outlet stage of the valve consists of curved blades that turn the flow as is travels outward. Fluid enters the outlet stage axially through the internal axial passage which connects the inlet stage to the outlet stage. Since the fluid enters the stage axially, it is assumed to have no angular momentum as it enters the control volume. As the fluid is directed outward and tangential to the spool surface, a reaction torque is experienced by the spool as it turns the flow. The outlet stage is assumed to be ideal such that the fluid is completely turned by the blades. With this assumption, the outlet stage can be thought of as a rotating tangential outlet nozzle with area $A_{out}$ offset a distance $R_{out}$ from the center of the spool. The torque generated by the outlet stage is:

$$\tau_{out} = \sum_1^N (R_{out} x(v - v_{CV}))_{out} \cdot \dot{m}_{out} = \frac{\rho \cdot R_{out}}{A_{out} \cdot N} \cdot Q^2 - R_{out}^2 \cdot \rho \cdot \omega \cdot Q \qquad \text{Eq. (7)}$$

$v_{CV}=R_{out} \cdot \omega$ is the velocity of the control volume. Equating the inlet and outlet torque to the friction torque in the steady state produces the equation for $\omega$, the angular velocity of the spool generated by both stages:

$$\omega = \frac{\rho \cdot Q^2}{N \cdot R^2 \cdot \left(A_{eff} \cdot \frac{\mu}{c} + \frac{R_{out}^2}{R^2} \cdot \rho \cdot Q\right)} \cdot \frac{R_{in}}{\overline{A}} \qquad \text{Eq. (8)}$$

From Eq. 16, it is seen that the combined inlet and outlet effects can be normalized such that the system resembles an inlet only configuration. $\overline{A}$ is defined as the equivalent area, and is given by:

$$\frac{1}{\overline{A}} = \frac{1}{A_{in}} + \frac{R_{out}}{R_{in} \cdot A_{out}} \qquad \text{Eq. (9)}$$

Note that setting $R_{out}=0$ reduces Eq. 8 to the inlet turbine only case.

Eq. 8 illustrates the dual effects of the outlet stage turbine on the spool velocity.

$$\frac{R_{out}}{R_{in} \cdot A_{out}}$$

corresponds to the angular momentum generated by the tangential outlet. Either increasing the moment arm $R_{out}$ or decreasing the outlet nozzle area $A_{out}$ (and thereby imparting more kinetic energy to the fluid at the expense of pressure drop) will increase the spool velocity. The momentum generated by the outlet, however, is counteracted by the additional $$\frac{R_{out}^2}{R^2} \cdot \rho \cdot Q$$

term, which corresponds to the angular momentum which must be transferred to the fluid as it is forced to rotate with the same circumferential velocity as the outlet blades. As the fluid flows radially outward, more momentum must be transferred to the fluid as the circumferential velocity of the outlet blades increases proportionally with $R_{out}$. Therefore, increasing the outlet moment arm $R_{out}$ also has the effect of decreasing the spool speed.

The greatest benefit from the addition of the outlet stage turbine is that the effects of the inlet geometry on the PWM functionality of the valve can be decoupled from the spool velocity. By using the outlet stage to provide a majority of the momentum to rotate the spool, the inlet orifice area and thickness of the helical barriers can be optimized for PWM.

Figure 22:
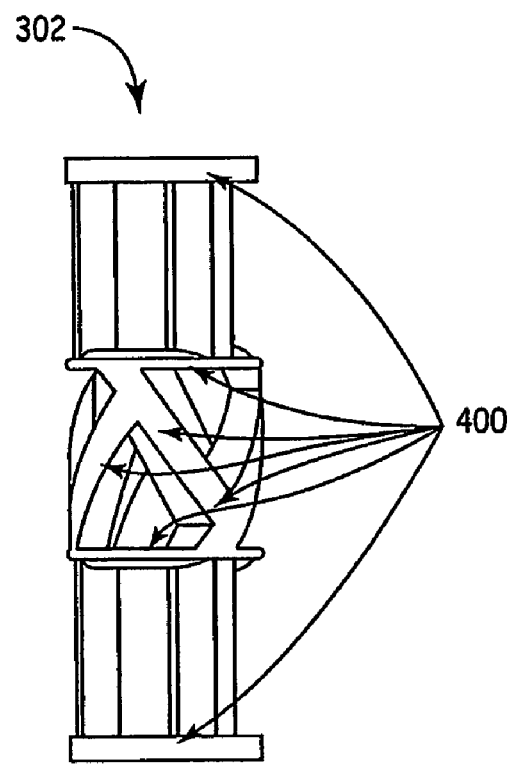
FIG. 22 is a side view of the spool which illustrates bearing surface areas.

A simple computational fluid mechanics (CFD) analysis was performed to calculate the effective bearing surface area of the spool 302. FIG. 22 shows bearing surfaces 400 of spool 302. The effective surface area accounts for the contribution of the non-bearing surface area to the friction torque. The non-bearing surface area is defined to be the total surface area π·D·L minus the bearing surface area, which is shown in FIG. 16. $A_{eff}$ is given by:

$$A_{eff} = A_{bearing} + \alpha \cdot (\pi \cdot D \cdot L_s - A_{bearing}) \quad \text{Eq. (10)}$$

α is defined to be the ratio of non-bearing shear stress to bearing surface shear, or $$\alpha = \frac{\sigma_{non-bearing}}{\sigma_{bearing}}.$$

The objective of our CFD analysis is to determine α. In this design, the radial bearing surface area clearance is 2.54×10$^5$ m while the radial clearance for the remaining surface area is 3.175×10$^3$ m. Petroff's Law, which assumes a Newtonian fluid where shear stress is inversely proportional to clearance, would predict that the effect of the non-bearing area is negligible. Experiments with a 0.0323 m diameter rotary valve, however, revealed otherwise. This is because the fluid in contact with the non-bearing surface area is trapped in a pocketed area between the helical barriers. The fluid in the pocket will recirculate due to the no-slip conditions at the outer stationary sleeve wall as the spool rotates. These vortices will increase the frictional force in the pocketed area.

In this current design, however, the fluid is not completely trapped between the helical barriers. The inlets between the barriers direct fluid toward the center of the spool. Therefore, it may be expected that there will be less circulation and vorticity in this current design, which should correspond to less friction in the non-bearing surface area. Thus the following analysis is a conservative prediction of what the non-bearing friction will be.

Figure 23:
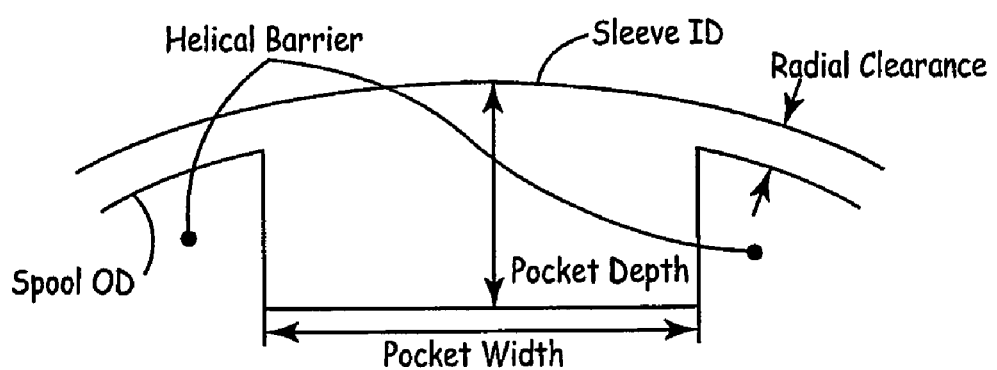
FIG. 23 is a diagram which shows a pocketed non-bearing surface.
Figure 24:
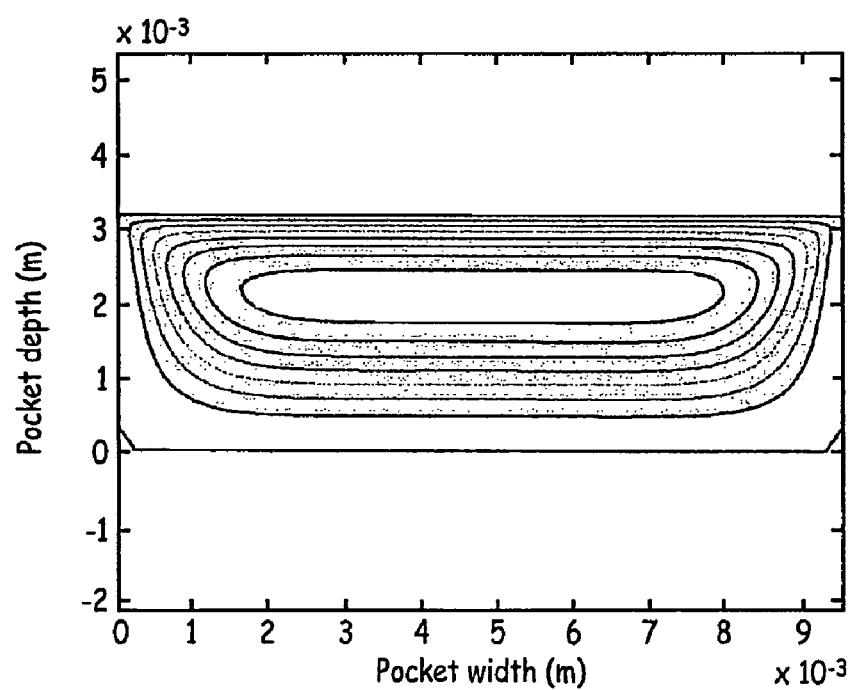
FIG. 24 is a graph of pocket depth versus pocket width and shows the stream lines within the pocket of FIG. 23.
Figure 25:
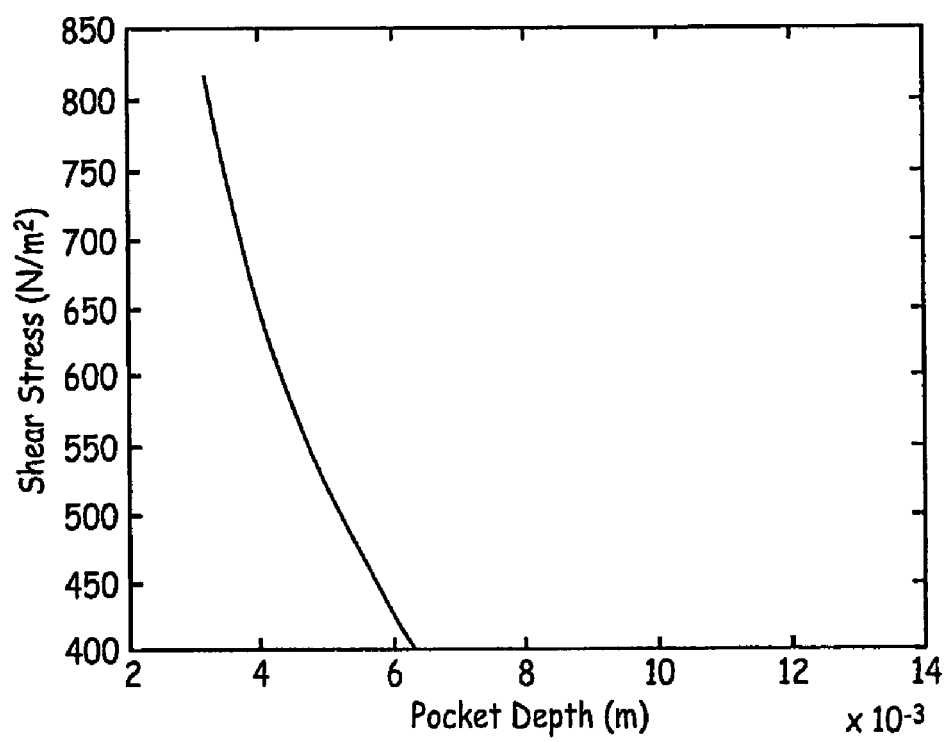
FIG. 25 is a graph of shear stress versus pocket depth for the pocket of FIG. 23.
Figure 26:
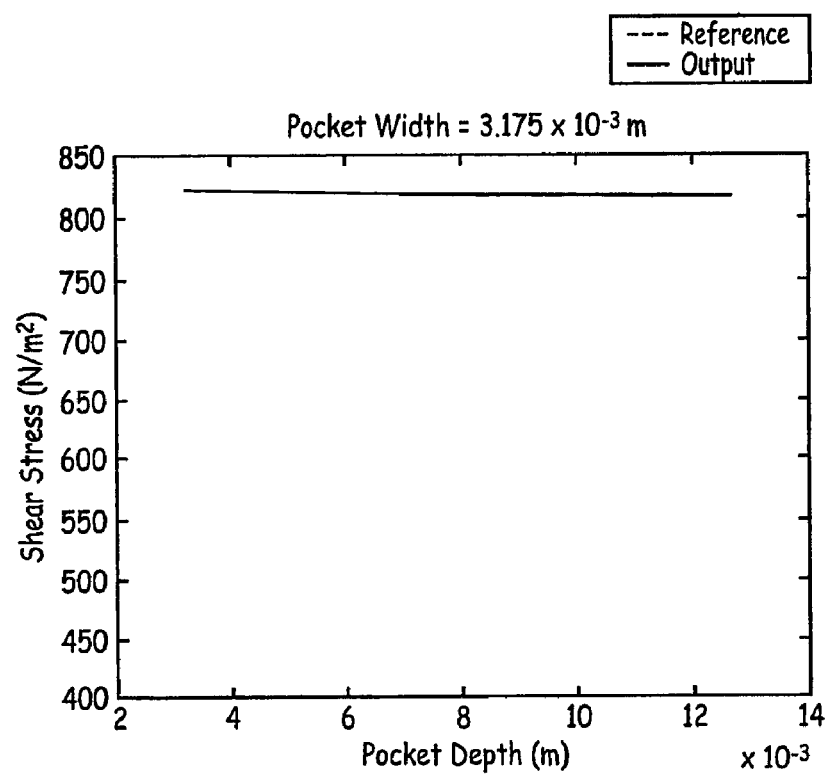
FIG. 26 is a graph of shear stress versus pocket width for the pocket illustrated in FIG. 23.

FIG. 23 is a simplified model of the pocketed area. Although the actual upper boundary of the domain is curved (sleeve ID) as shown in FIG. 23, the upper surface is approximated as flat to simplify the analysis. As a further simplification, the system is inverted. Instead of rotating the spool in the simulation, the sleeve is rotated. In the computational domain, this equates to a moving upper boundary. The CFD analysis assumes two-dimensional, steady, incompressible Newtonian flow. The pocket was modeled as a rectangular chamber with a moving upper boundary. The upper boundary was given a velocity that corresponded with other valves, a 0.0323 m diameter spool rotating at 27 Hz. Both the depth and width of the pocketed area were explored. A plot of the streamlines generated by the CFD code illustrating the primary vortex of the flow is shown in FIG. 24. The primary vortex accounts for the circulation occurring within the pocket between the helical bathers. The numerical results of the analysis are presented in FIGS. 25 and 26. These figures show that the width of the pocket has a negligible effect on the shear stress, while the depth of the pocket is crucial. Therefore, with this current design, the pocket depth, or clearance of the non-bearing area, should be designed to be as large as possible while still maintaining adequate wall thickness for the internal axial passage between the inlet and outlet stages. From FIG. 25, for a depth of 3.175×10$^3$ m, the corresponding shear stress is predicted to be roughly 820 N/m$^2$=$\alpha_{non\ bearing}$. The shear stress for the bearing surface of a 0.0323 m diameter spool rotating at a frequency of 27 Hz with a radial clearance of 2.54×10$^5$ m results in $\alpha_{bearing}$=4169 N/m$^2$. Therefore, $$\alpha = \frac{\sigma_{non-bearing}}{\sigma_{bearing}} = 19.7\%. \quad \text{Eq. (11)}$$

Internal leakage of the valve can be estimated conducted by assuming laminar leakage flow. Since the only feature of the valve that separates high pressure fluid from low pressure fluid is the helical barrier, the valve leakage is assumed to be the flow across this area.

$$Q_{leak} = \frac{Per \cdot C^3 \cdot (P_{load} - P_{open})}{12 \cdot \mu \cdot H_t} \quad \text{Eq. (12)}$$

Per is the perimeter of the leakage surface. This equation indicates a strong relationship between the leakage and the clearance. A small clearance is desirable to reduce leakage, however a small clearance increases the viscous friction drag on the spool and reduces the spool velocity.

Several trade offs exist in the design of the self-spinning, 3-way rotary valve. By specifying the spool length L and diameter D, the optimal rhombus inlet area becomes constrained by $$\frac{A_{in}}{\kappa^2} = \frac{\pi \cdot D \cdot L}{48 \cdot N}$$

so that $A_{in}$ cannot increase or κ cannot decrease simultaneously to reduce throttling loss. For the same spool dimensions, it can be shown however, that increasing $A_{in}$ will have a greater effect to reduce throttling loss than by decreasing κ. However, Eq. 8 shows that rotational spool ω would decrease if $A_{in}$ were to increase. This can be remedied by decreasing the outlet turbine area $A_{out}$ or by increasing the number of helical section N. Another trade off in the design exists between leakage across the helical barriers and ω. A smaller radial clearance c decreases leakage, in spool velocity.

The PWM frequency of this design is proportional to the spool velocity by a factor N, the number of helical barriers as defined in FIG. 11. By increasing N, the PWM frequency of the valve can be increased for a given ω. However, N is limited by leakage, as the thickness of the barriers Ht must decrease with N.

One prototype is sized for a nominal flow rate of 40 l/m at a maximum operating pressure of 7 Mpa. The design goals for the valve are to maximize the spool velocity, and minimize losses and physical size. Based on the analysis presented herein as well as considering manufacturing constraints, the final parameters chosen for one example are summarized in Table 2.

TABLE 2

| Parameter | SI | English | Description |
|---|---|---|---|
| N | 3 | — | Number of inlets |
| D | .0254 m | 1.0 in | Spool diameter |
| L | .0856 m | 3.37 in | Spool length |
| C | 2.54 × 10$^{-5}$ m | .001 in | Radial clearance |
| A | .197 | — | Ratio of shear |
| $A_{bearing}$ | .0015 m$^2$ | 239 m$^2$ | Bearing area |
| $A_{in}$ | 1.22 × 10$^{-5}$ m$^2$ | .0189 m$^2$ | Inlet rhombus area |
| $A_{out}$ | 4.68 × 10$^{-5}$ m$^2$ | .0726 in$^2$ | Turbine exit area |
| $R_h$ | .0065 m | .2558 in$^2$ | Rhombus height |
| $R_w$ | .0037 m | .1476 in$^2$ | Rhombus width |

TABLE 2-continued

| Parameter | SI | English | Description |
|---|---|---|---|
| β | 1.05 rad | 60 deg | Helix angle |
| $H_t$ | .003 m | .1181 in | Helix thickness |
| $C_d$ | .6 | — | Orifice coefficient |
| Q | $6.3 \times 10^{-4}$ m³/s | 10 gpm | Flow rate |
| $P_{load}$ | $6.89 \times 10^6$ Pa | 1000 psi | Load pressure |
| $P_{relief}$ | $7.58 \times 10^6$ Pa | 1100 psi | Relief pressure |

From the design parameters, one can predict that the spool can achieve a rotational velocity of 28 Hz, which corresponds to a PWM frequency of 84 Hz. The system efficiency is 78%. This estimated system efficiency includes the energy required to drive the valve. No additional power source is required.

A dynamic model of the system shown in FIG. 13 was simulated numerically. The system consists of an ideal flow source with a constant flow rate of $6.31 \times 10^4$ m³/s and an ideal relief valve set at $7.58 \times 10^6$ Pa. The accumulator is assumed to be adiabatic with a pre-charge pressure of $6.89 \times 10^5$ Pa and a pre-charge gas volume of 0.16 L. An orifice load described by Eq. 1 with a diameter of 0.0025 m and discharge coefficient of 0.7 was used in the model. This model assumes no fluid compressibility. The complete system is controlled using a pressure control algorithm of the form:

$$s(t) = K_{ff}\sqrt{P_{ref}} + K_{fb}(P_{ref} - P_{out}(t)) \quad \text{Eq. (13)}$$

where s(t) is the desired duty ratio and $P_{\{ref\}}$ is the desired reference output pressure. $K_{fb}$, the feedback gain, was chosen to be 0.01, which provided a good compromise between responsiveness and overshoot. $K_{ff}$, the feedforward gain, was calculated to be $2.69 \times 10^4$ based on an orifice load. The relationship between duty ratio, s(t), and the axial position of the spool, l, is given in FIG. 20. Inverting the load branch curve in FIG. 20 produces the relationship for calculating the axial position as a function of duty ratio. The axial position of the spool corresponding to the desired duty ratio is regulated by controlling the input to a controller which operates the axial spool positioning motor 372 in FIG. 10. The input is given by:

$$i = \frac{f(u)}{A_{end}} \quad \text{Eq. (14)}$$

u is the input to the motor controller, l is the axial position of the spool, and $$A_{end} = \frac{\pi}{4} \cdot D^2$$

is the area of one end the spool.

Figure 28:
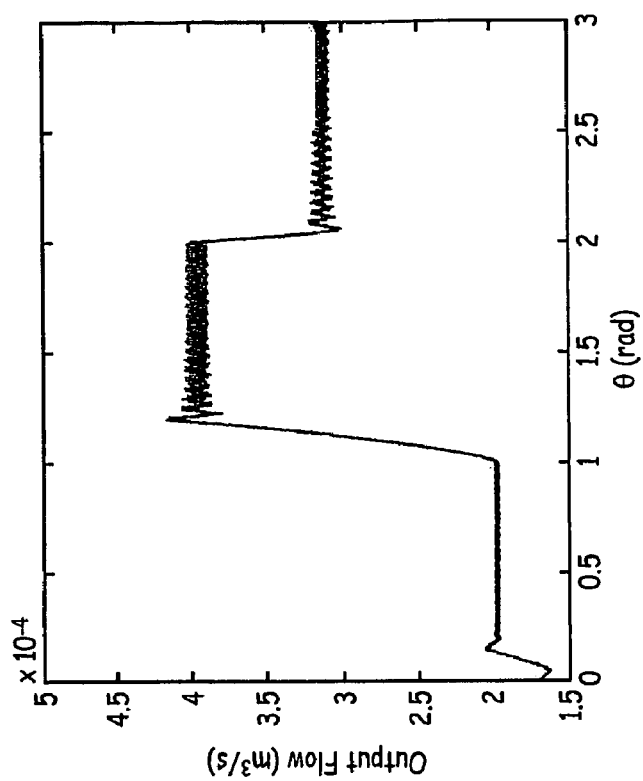
FIG. 28 is a graph of output flow versus time for a simulated output flow.
Figure 27:
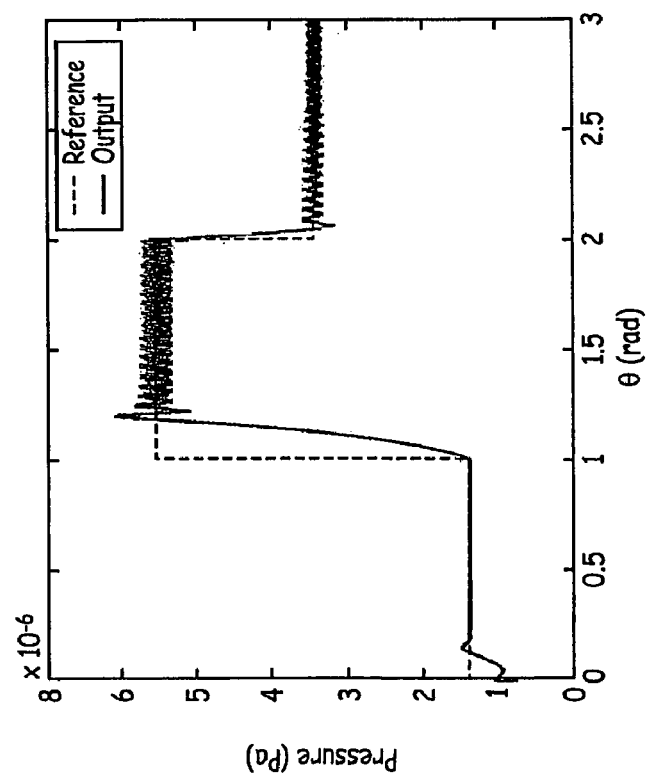
FIG. 27 is a graph of pressure versus time for a simulated output pressure.

A PI controller with feedforward is used to track 1 to a reference signal. The system poles were placed at 10 rad/s and 15 rad/s. Simulations of the axial position controller predict that the controller can reposition the spool from full on to full off in less than 0.15 s. A step reference pressure from $1.3789 \times 10^6$ Pa to $5.52 \times 10^6$ Pa with a second step to $3.45 \times 10^6$ Pa was simulated. This input corresponds to a step in flow from $199 \times 10^4$ m³/s to $3.97 \times 10^4$ m³/s to $3.15 \times 10^4$ m³/s. The system was able to complete the first step in 0.9 s and the second step in 0.054 s. The average pressure ripple was 6.67%. The results of the simulation are presented in FIGS. 27 and 28, and show that the 3-way rotary valve with fluidic linear actuation can work effectively to modulate flow.

The response of the simulated system is currently limited by the accumulator. The speed of the system can be increased by either decreasing the pre-charge pressure, or decreasing the precharge volume of the accumulator. Either of these modifications, however, will increase the magnitude of the output pressure ripple. Another alternative is to increase the PWM frequency of the system. This can further improve the response without the penalty in ripple size.

In general, a pulse width modulated (PWM) fluidic valve is provided. The valve can be cycled from on to off at high frequencies, for example, on the order of several hundred hertz. The flow through the valve is controlled by varying the fraction of each cycle that the valve is open. The flow rate through the valve is infinitely variable between zero flow and maximum flow. Despite its high frequency, the valve can also provide high fluid flow rates with low pressure drops. Pressure losses are minimized by providing sufficiently large port openings, and by reducing the time during which the switching port is partially obstructed by the valve spool. In one configuration, the spool of the valve is driven by a linkage having two degrees of freedom, one in a linear direction and one rotational. The valve is applicable to many types of installation, for example, a fixed displacement hydraulic pump in which the valve can control the output of flow of the pump; or a fixed displacement motor in which the valve can control the output speed of the motor. Such a valve configuration is for use with hydraulic motors, hydraulic transformers, mechanical transformers achieved using hydrostatic transmission, etc. This configuration provides a high frequency response which makes for superior operation as a pulse width modulated valve. The valve can be combined with a controller to provide software enabled features, such as precise pressure control, flow control, power control or optimizing system efficiency. For example, such software can be implemented in drivers 144 and 146, or in software which controls such drivers. The valve can operate at high frequencies which thereby improves controllability. The valve varies flow rate without throttling the flow which thereby reduces input power and lowers operating costs. Such a valve configuration provides for improved size, weight and efficiency over other configurations. The spool may be moved rotationally and/or axially using fluid forces.

The above description of the present invention is for illustrative purposes only. The techniques and description set forth above may be modified as appropriate. For example, the working fluid could be changed from a liquid to a gas. As a second example, although only two ports are shown, other configurations could be used. For example, using additional ports will increase the pulse cycle frequency for the same spool rotational speed. In one configuration, three such ports may be desirable due to the stable nature of a triangular configuration, and the increased pulse cycle frequency. The spool and cylindrical housing need merely be moved relative to one another. The actual movement, rotational or linear, can be by movement of any one of the spool or cylindrical housing or a combination of both. During operation, the angular velocity should exceed some minimum threshold for the valve to be operational. Once the minimal velocity has been met, the average flow rate should be nominally independent of the angular velocity of the valve. Note that fluid inertia and compressibility may start to affect the actual flow rate at high rates of pulsing. The rate of rotation of the spool sets the frequency of the pulses. In some configurations, the valve is coupled to an accumulator on the load side of the system. This enables averaging the discrete pulses of flow from the valve into a steady flow applied to the load with a "ripple" superimposed on top of the flow. Increasing the rate of pulsing (by increasing the angular velocity of spool or by increasing the number of ports) reduces the amplitude of the ripple which is typically desirable. With the present invention, for given flow rate the valve can pulse the flow at a higher rate than a linear valve. However, in general, the rate of rotation does not nominally change the average flow rate.

In contrast to linear valves, in the present invention the fraction of the period that the fluid flow is partially blocked by the blocking feature traveling over the fluid ports in the sleeve is the same regardless of the frequency. In linear valves, the fraction of the cycle that the flow is partially blocked increases with frequency. The partially blocked state is undesirable in that the flow is throttled and power is lost. In addition, as mentioned above, the valve can be run at high frequencies without increasing the relative small fraction of the cycle that the flow is throttled.

Although the specific embodiments shown above illustrate one fluid path arrangement, other arrangements can be used in accordance with the present invention. For example, the spool can be constructed to allow the flow of fluid out of the depression in the spool and in the axial direction. For example, referring to FIGS. 3 and 5, radial holes 170 may be removed. Alternatively, slots may be cut in the end seal 162 whereby fluid may flow out of the depression and along the axial direction. In yet another configuration, the seal 162 may be removed altogether. However, seal 162 may be advantageous in holding the spool concentrically with the sleeve. In another configuration, the valve can be constructed such that flow path is reversed, in other words, fluid can enter through the spool and exit through the ports in the sleeve. In yet another configuration (see FIGS. 7A-E, for example), the center bore of the spool is divided into two separate chambers, one connected to spool feature 168 (see FIG. 3), and the other connected to feature 166 through passages similar to ports 170. The two chambers are then connected to outlet ports which are separated in the axial direction. This configuration enables the valve to act as a three way valve that allows flow through either of the outlet ports. The 3-way design is particularly useful if the fluid flow is used to achieve the self-spinning feature as the total flow going through the valve is not dependent on the duty ratio. This is not the case with the 2-way design in FIGS. 2-5. Instead of having one inlet port and two outlet ports, the 3-way valve can be configured to have two inlet ports and one inlet port. Such a 3-way valve can be used for providing variable displacement function for a motor.

The spool can be configured as desired. For example, the spool can be hollow in order to reduce mass. However, the spool may also be solid, or partially solid as desired. If a solid spool is used, some type of exit path should be provided for the fluid. This can be done in a number of different ways. In a first configuration, an axial escape path is provided for the fluid as discussed above. In another configuration, a hole is provided radially down into the spool with axial ports extending into the end of the spool to meet the radial holes. In yet another configuration, holes may be skewed between the radial and axial directions. If fluid forces are used to spin the spool as discussed above, the rate of the rotation will be a function of the flow through the valve. Thus, in a 2-way configuration, the flow and the rotational speed will vary with the duty ratio. If a 3-way configuration (such as in FIGS. 7A-E) is used, the flow and the rotational speed will be largely independent from the duty ratio. The precise speed for proper valve operation is dependent upon spool configuration. However, it is preferable that the speed be maintained within some reasonable bounds.

A helical cut for the depression in the spool may be beneficial in that it implements a linear relationship between the axial position of the spool and the width of the "duty cycle" of each pulse. However, the depression may be cut with some alternative profiles to achieve the desired pulse profile. The invention is not limited in particular to a helical cut. Similarly, the ports in the cylindrical housing are not required to be positioned perfectly radially. In fact, in order to implement a spool which is driven by fluid flow forces, it may be desirable to skew these ports off of the radial direction.

Although the valve is described to be a pulse width modulated valve in that the duty ratio of the valve being fully on versus the cycle time is modulated as determined by the axial position of the spool, more precise control of the timing of when the valve is turned on and turned off can be attained using the invention. This can be achieved for example, in the configuration in FIG. 3, by moving the spool axially so as to enable the ports 136/138 to avoid or to approach the blocking feature 160B in FIG. 3 as the spool rotates. This in turn lengthens or shortens the individual pulse width.

Figure 6:
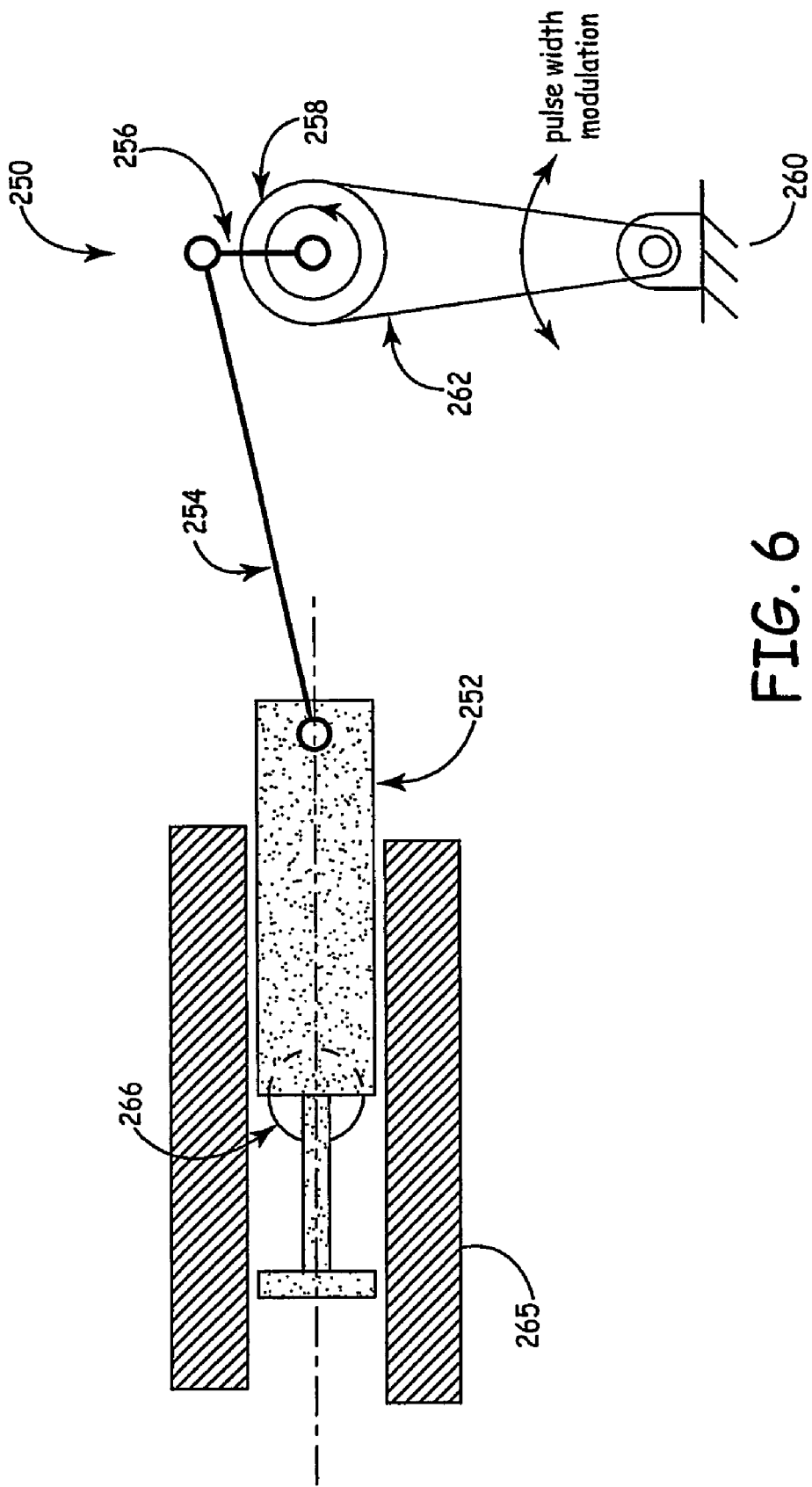
FIG. 6 is a schematic diagram of another embodiment.

One embodiment is shown in FIG. 6 which consists of a rotating mechanism 250 with the obstacle block or valve spool 252 connected to arms 254,256 of the mechanism. The valve spool may also be a poppet for reduced leakage. A drive motor 258 coupled to ground 260 through link 262 drives the spool 252. Spool 252 moves in housing 264 and selectively blocks port 266. While a sliding obstacle block is suggested in FIG. 6, a rotating obstacle block could also be used. The modulating function can be achieved by sliding or rotating another link. The linear spool poppet configuration may have some advantage in sealing and leakage reduction over the rotary configuration.

In general, the valve of the present invention allows pulsing of the flow of the fluid without requiring accelerating or decelerating of the valve spool. In the embodiment suggested in FIG. 6, while the valve spool does accelerate and decelerate, the rotating driving element does not require acceleration or deceleration. In some configurations, it is possible to vary the flow from zero flow to a maximum flow. However, the valve may also be configured such that the flow is only variable over some smaller fraction of the total possible range.

In one configuration, the spool is rotated continuously relative to the sleeve. In another configuration, the spool is rotated back and forth in the circumferential direction rather than continuously rotated.

The present invention includes a novel self-spinning rotary on/off valve concept that is potentially more efficient than a comparable linear valve of equal switching frequency and flow rating. The analysis herein predicts that a rotary valve sized for a nominal flow rate of 40 l/m can achieve a PWM frequency of 84 Hz, roughly a 400% improvement over typical current linear valve designs. This frequency is attained by harvesting waste throttling energy from the system flow. No external actuation is needed to rotate the spool in this design. Simulation show that the hydro-static linear control scheme is effective in controlling the axial position of the spool. The simulation also shows that variable displacement pump functionality utilizing the rotary valve can be achieved by adding closed-loop control to the system. A number of trade offs between performance and efficiency exist in the design of the rotary on/off valve. The equations presented herein paper provide a means for sizing and optimizing the design based upon physical constraints and efficiency requirements. An analysis of the various modes of power loss in the system reveal that throttling during transition accounts for a majority of the loss in the design. Reducing or eliminating the flow throttled across the relief valve during transition will improve efficiency.

Although the present invention has been described with reference to preferred embodiments, workers skilled in the art will recognize that changes may be made in form and detail without departing from the spirit and scope of the invention. Similarly, although a particular spool configuration is illustrated, the spool can be of any appropriate shape. In another example configuration, a linkage or armature is connected radially offset from the spool and is used to rotate the spool using a reciprocating motion. In general, the present invention utilizes the continuous rotary motion of an element in order to achieve high frequency periodic motion which is used to move a valve obstacle. In one alternative of the outlet turbine, the turbine features are carried on the inner sleeve of the housing and an outlet nozzle (orifice) is provided on the rotating spool. The above analysis assumes a liquid as the working fluid, however, the fluid may comprise a gas. Although the spool is described as rotating in the sleeve, only relative movement is needed.

What is claimed is:

1. A pulse width modulated fluidic valve, comprising:
a housing having an elongate bore, a length and first and second ports which extend from outside the housing into the bore; and
a continuously rotatable spool carried in the bore and movable in a direction of the length of housing and freely rotating in the bore, the spool having a variable blocking feature which selectively blocks passage of fluid between the first and second ports as a function of angular position relative to the first and second ports and as a function of linear position along the length of the housing;
wherein rotation of the rotatable spool in the housing is driven by flow of fluid between the first and second ports; and
wherein the spool includes a turbine region to cause spool rotation in response to fluid flow.

2. The apparatus of claim 1 wherein the turbine region is on an outlet portion of the spool.

3. The apparatus of claim 1 wherein the turbine region is on an inlet portion of the spool.

4. The apparatus of claim 1 including a third port and wherein fluid flow enters the first port and exits through the second and third ports.

5. The apparatus of claim 1 wherein the rotatable spool includes a central portion positioned between two outlet portions and wherein fluid flows from the central portion through the spool and to the outlet portions.

6. The apparatus of claim 1 wherein the rotatable spool includes a central portion positioned between two inlet portions and wherein fluid flows to the central portion from the spool from the inlet portions.

7. The apparatus of claim 1 wherein the variable blocking feature comprises a seal which provides a seal with the spool and a wall of the bore.

8. The apparatus of claim 1 wherein the seal is helical.

9. The apparatus of claim 1 wherein the variable blocking feature comprises two seals which provide fluidic seals with an outer circumference of the rotatable spool and a wall of the elongate bore of the housing.

10. The apparatus of claim 1 including an optical sensor arranged to detect relative axial position of the spool in the housing.

11. The apparatus of claim 1 including an optical sensor arranged to detect the relative angular position of the spool in the housing.

12. The apparatus of claim 1 wherein the first port of the housing comprises an inlet having a rhombus shape.

13. The apparatus of claim 1 wherein ends of the spool are sealed and the spool moves axially in the housing in response to fluid pressure applied to an end of the housing.

14. The apparatus of claim 1 wherein a flow rate of fluid which exits the housing is a function of axial position of the spool in the housing.

* * * * *

UNITED STATES PATENT AND TRADEMARK OFFICE
CERTIFICATE OF CORRECTION

| | | |
|---|---|---|
| PATENT NO. | : 8,286,939 B2 | Page 1 of 1 |
| APPLICATION NO. | : 12/444910 | |
| DATED | : October 16, 2012 | |
| INVENTOR(S) | : Perry Y. Li and Thomas R. Chase | |

It is certified that error appears in the above-identified patent and that said Letters Patent is hereby corrected as shown below:

Please insert the following at Col. 1, line 3:

--GOVERNMENT RIGHTS
This invention was made with government support under CMS-0409832 awarded by the National Science Foundation. The government has certain rights in the invention.--

Signed and Sealed this
Fourth Day of December, 2012

David J. Kappos
*Director of the United States Patent and Trademark Office*